(12) United States Patent
Sadwick et al.

(10) Patent No.: US 7,782,644 B2
(45) Date of Patent: Aug. 24, 2010

(54) METHOD AND APPARATUS FOR SUPPLYING POWER

(76) Inventors: Laurence P. Sadwick, 3767 E. Brockbank Dr., Salt Lake City, UT (US) 84124; Mohammad M. Mojarradi, 163 Starlight Crest Dr., La Canada, CA (US) 91011; Ruey-Jen Hwu, 3767 E. Brockbank Dr., Salt Lake City, UT (US) 84124

(*) Notice: Subject to any disclaimer, the term of this patent is extended or adjusted under 35 U.S.C. 154(b) by 638 days.

(21) Appl. No.: 11/681,767

(22) Filed: Mar. 3, 2007

(65) Prior Publication Data

US 2008/0211468 A1 Sep. 4, 2008

(51) Int. Cl.
*H02M 5/275* (2006.01)
*H02M 5/293* (2006.01)
(52) U.S. Cl. .................................. 363/163; 363/149
(58) Field of Classification Search .................. 363/1, 363/2, 3, 8, 9, 10, 71, 149, 159, 163
See application file for complete search history.

(56) References Cited

U.S. PATENT DOCUMENTS

| | | | |
|---|---|---|---|
| 5,089,947 A * | 2/1992 | Driscoll et al. ................. 363/20 |
| 5,229,308 A | 7/1993 | Vo et al. | |
| 5,349,223 A | 9/1994 | Mojaradi et al. | |
| 5,382,826 A | 1/1995 | Mojaradi et al. | |
| 5,739,582 A | 4/1998 | ElHatem et al. | |
| 5,914,865 A * | 6/1999 | Barbehenn et al. ........ 363/21.15 |
| 6,014,323 A * | 1/2000 | Aiello et al. ................... 363/71 |
| 6,870,417 B2 * | 3/2005 | Mercier ........................ 327/493 |
| 7,336,059 B2 * | 2/2008 | Steigerwald et al. ........ 323/266 |
| 2004/0017252 A1 * | 1/2004 | Miyazaki ....................... 330/10 |
| 2004/0174147 A1 * | 9/2004 | Vinciarelli ................... 323/266 |
| 2005/0047176 A1 * | 3/2005 | Fukumoto .................... 363/17 |
| 2005/0099144 A1 | 5/2005 | Sanchez | |
| 2005/0116662 A1 | 6/2005 | Sanchez | |
| 2005/0168271 A1 * | 8/2005 | Brox ........................... 327/540 |
| 2006/0181228 A1 | 8/2006 | Sanchez-Olea | |

OTHER PUBLICATIONS

Product Brief entitled "LightSmart D100 (Current Balance System)", by CEYX Technologies, Inc. 2 pages.
U.S. Patent Application entitled "Processes and Packaging for High Voltage Integrated Circuits, Electronic Devices, and Circuits" of Laurence P. Sadwick et al., filed Sep. 29, 2006.

* cited by examiner

*Primary Examiner*—Harry Behm
*Assistant Examiner*—Matthew Grubb
(74) *Attorney, Agent, or Firm*—Hamilton, DeSanctis & Cha

(57) ABSTRACT

A power supply includes a power source having at least one power source output, and a plurality of drivers connected to the at least one power source output. At least one of the plurality of drivers includes a bridge network having a first switch, a second switch and a bridge network output. The first switch is connected between the at least one power source output and the bridge network output. The second switch is connected between the bridge network output and a ground. The bridge network further includes at least one control input connected to the second switch to direct electrical current from the at least one power source output either substantially through the bridge network output or through the second switch to ground.

5 Claims, 14 Drawing Sheets

US 7,782,644 B2

METHOD AND APPARATUS FOR SUPPLYING POWER

BACKGROUND

High voltage power supplies are needed for many types of electronic devices. A low voltage may be converted to the appropriate high voltage by a transformer and associated signal conditioning components to obtain the desired voltage and current level. Often multiple electronic components and systems are powered by a single power supply. However, some types of loads may need individual current control. Typical power supplies provide global voltage or current control, but not individual voltage or current control for each of a number of outputs. A common solution is to provide a separate regulated power supply for each load or a subset of loads but not the entire set of loads, increasing the size and cost by including a transformer and filtering and control circuitry for each load or subset of loads.

SUMMARY

An exemplary power supply includes a power source having at least one power source output, and a plurality of drivers connected to the at least one power source output. At least one of the plurality of drivers includes a bridge network having a first switch, a second switch and a bridge network output. The first switch is connected between the at least one power source output and the bridge network output. The second switch is connected between the bridge network output and a ground. The bridge network further includes at least one control input connected to the second switch to direct electrical current from the at least one power source output either substantially through the bridge network output or through the second switch to ground.

An exemplary operation for driving current to an output includes generating an envelope waveform, increasing a voltage of the envelope waveform to generate a high voltage envelope, and switching a control input to either drive the high voltage envelope through a bridge network to the output or turn off the output and direct a portion of the high voltage envelope to a ground through the bridge network. The control input is operated by a lower voltage than the high voltage envelope.

BRIEF DESCRIPTION OF THE DRAWINGS

Illustrative embodiments are shown in the accompanying drawings as described below.

DESCRIPTION

Figure 1:
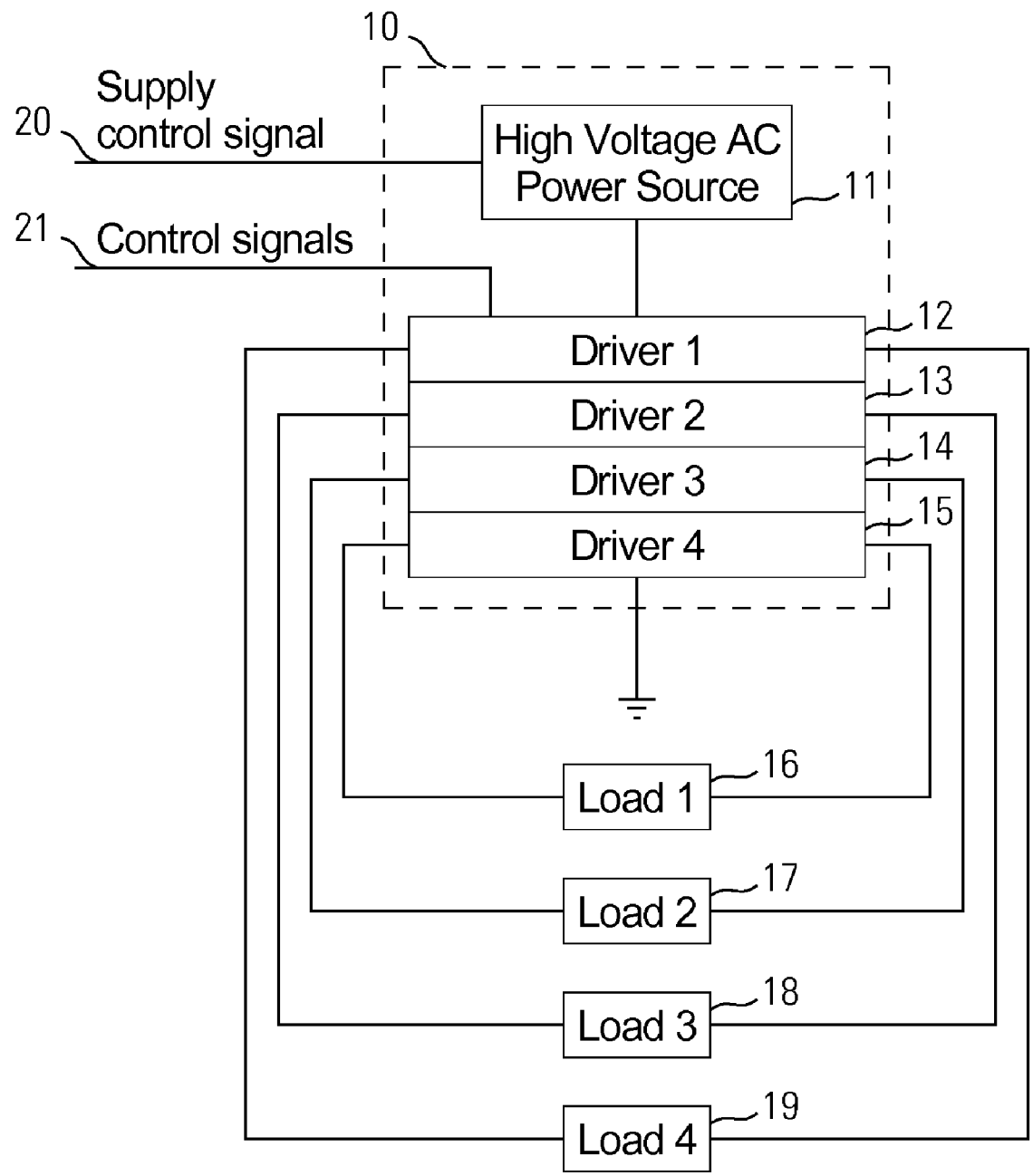
FIG. 1 is a block diagram illustrating an exemplary high voltage power supply with multiple drivers each powering a load.

The drawings and description, in general, disclose a method and apparatus for providing multiple drivers with a single transformer or other power source in a high voltage power supply. The multiple drivers are individually controllable by low voltage analog and/or digital control signals. Referring now to FIG. 1, an exemplary embodiment of a power supply 10 is illustrated. A high voltage power source 11 is provided, such as a transformer with various associated signal conditioning elements. The power source 11 may supply any desired power signal, whether voltage controlled or current controlled or having some other control scheme, and may provide any desired waveform. In one exemplary embodiment, the power source 11 supplies an alternating current (AC) output or some other variant of a time-varying cyclic waveform, as will be discussed in more detail hereinafter. The power supply 10 includes multiple drivers 12, 13, 14, and 15 to power individual loads 16, 17, 18 and 19. The output of the power source 11 may be controlled by a control signal 20 to adjust the overall voltage or current level if desired. The power source 11 may be also pulse width modulated to vary the duty cycle and globally limit the overall current supplied to the drivers if desired. The output of each of the drivers 12, 13, 14 and 15 may be individually controlled by control signals 21.

Figure 2:
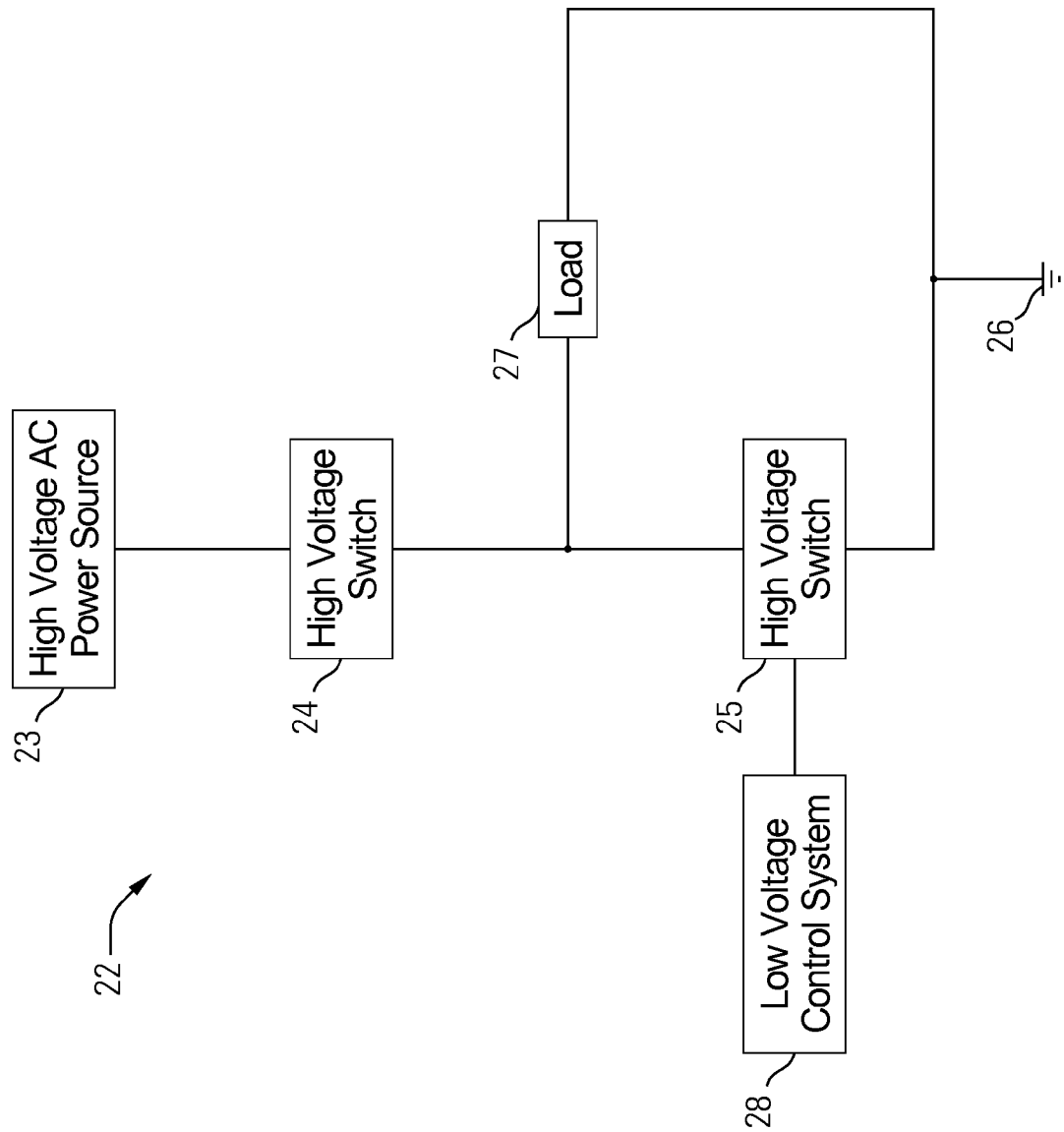
FIG. 2 is a block diagram of an exemplary driver with a half-bridge network.
Figure 3:
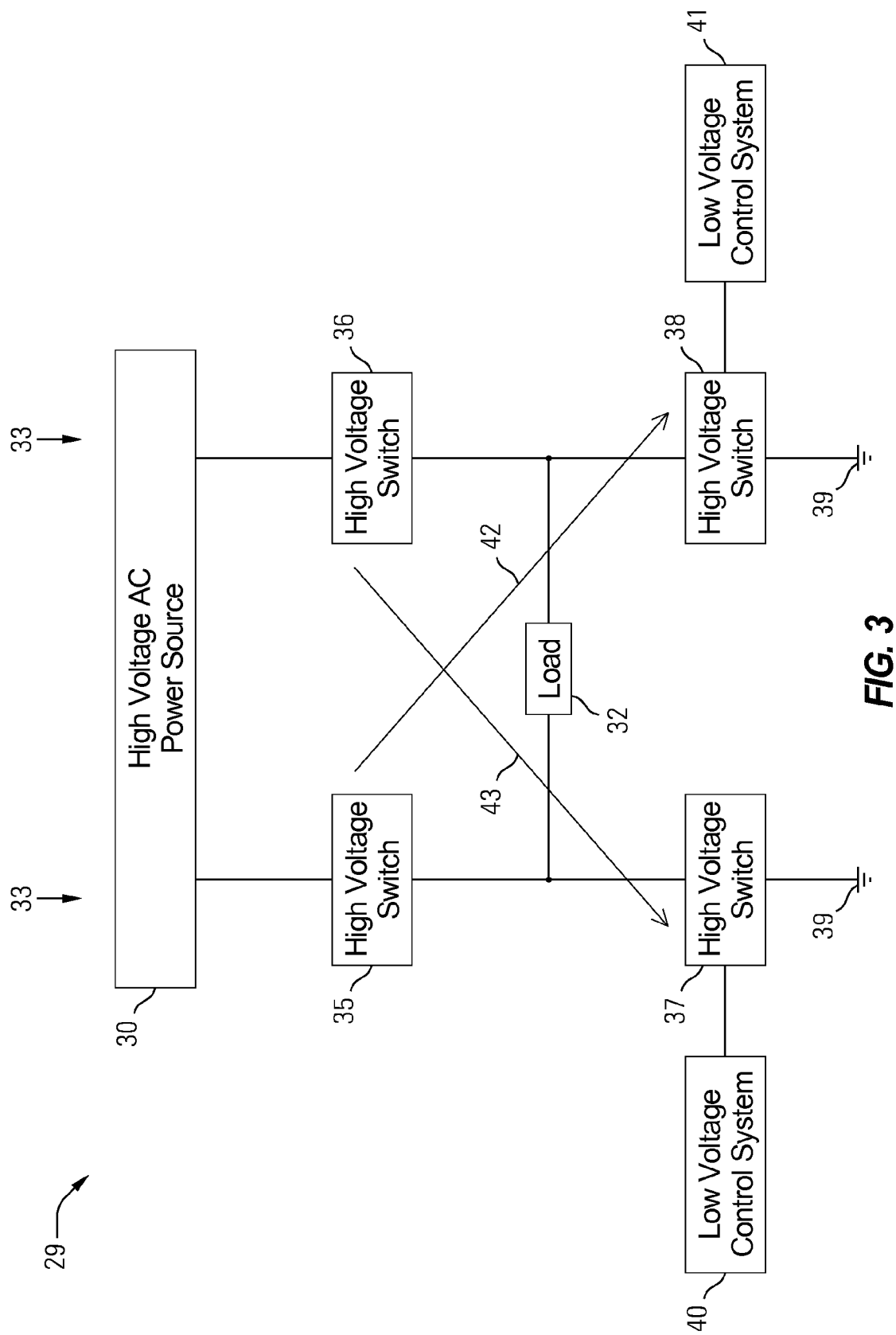
FIG. 3 is a block diagram of an exemplary driver with a full-bridge network.

The drivers may each comprise a half-bridge or full-bridge network, as illustrated in FIGS. 2 and 3, respectively. Referring now to FIG. 2, an exemplary driver 22 comprising a half-bridge network will be described generally. A high voltage power source 23 supplies a current having some envelope or waveform, such as an AC sine wave with a DC bias, as will be described in more detail hereinafter. A high-side switch 24 and low-side switch 25 are connected in series between the power source 23 and ground 26, with the switches 24 and 25 designed to withstand the high voltage from the power source 23. A load 27 is connected to the node between the high-side switch 24 and the low-side switch 25 and to ground 26. A low voltage control system 28 controls the switches 24 and 25, directing current from the power source 23 and the high-side switch 24 either through the load 27 or the low-side switch 25. This switching operation will be described in more detail below with respect to an exemplary schematic. Note that the method and apparatus for supplying power is not limited to use with any particular voltage levels, and the terms "low voltage" and "high voltage" are relative terms that are used generically. For example, in one nonlimiting purely exemplary embodiment, a low voltage may be any voltage lower than about 100 volts and a high voltage may be any voltage higher than about 100 volts.

Referring now to FIG. 3, an exemplary driver 29 comprising a full-bridge network will be described generally. One or more high voltage power sources 30 provide a current envelope with which the driver 29 powers a load 32. The driver has an 'H'-shaped network, made up of a left side 33 and a right side 34. Each side 33 and 34 comprises a high-side switch 35 and 36 and a low-side switch 37 and 38 connected between the power source 30 and ground 39. The load 32 is connected between the left side 33 and the right side 34 at the nodes between the high-side 35 and 36 and low-side 37 and 38 switches, forming an 'H' shape. Low voltage control systems 40 and 41 control the switches 35-38, directing the flow of current through the driver 29 and the load 32. If the left high-side switch 35 and right low-side switch 38 are opened, and the left low-side switch 37 and right high-side switch 36 are closed, the current will flow through the driver 29 from the left high-side switch 35, through the load 32 and the right low-side switch 38 to ground 39 along the left-to-right path 42 in FIG. 3. If the right high-side switch 36 and left low-side switch 37 are opened, and the left high-side switch 35 and right low-side switch 38 are closed, the current will flow through the right high-side switch 36, through the load 32 and the left low-side switch 37 to ground 39 along the right-to-left path 43 in FIG. 3.

Although the exemplary driver 29 with a full-bridge network is more complex than the driver 22 with a half-bridge network, it can be advantageous for certain types of loads.

The method and apparatus for supplying power may be envelope-driven with any desired waveform to meet the requirements of the load. For example, the high voltage power supply may generate any desired output such as a sine wave or variation thereof, a square wave, triangle wave, sawtooth, etc. The waveform of the current through the load tracks the waveform from the power supply, making the circuit envelope-driven. The method and apparatus for supplying power may alternatively be operated in a typical digital switching mode rather than being envelope-driven by using a direct current (DC) high voltage power supply if desired. Referring now to FIGS. 4A-4D, a number of exemplary envelopes that may be used with various exemplary embodiments of the method and apparatus for supplying power will be described. A first exemplary waveform illustrated in FIG. 4A comprises a sine wave 44 with a DC bias so that the bottom of the sine wave is at zero volts. Another exemplary waveform illustrated in FIG. 4B comprises a full-wave rectified sine (e.g., 46, 47, and 48). Another set of exemplary waveforms is illustrated in FIG. 4C, comprising a half-wave rectified sine having a series of positive half-sine curves (e.g., 49) each followed by a half-cycle period at ground or zero volts (e.g., 50). In this set of exemplary waveforms, two high voltage power supplies are used, each with the same half-sine wave envelope, but 180 degrees out of phase so that as a peak 49 is rising in the first waveform 51, the second waveform 52 is at a zero volt phase 53. Another set of exemplary waveforms generated by dual high voltage power supplies is illustrated in FIG. 4D, in which two waveforms 54 and 55 comprise sine waves centered around zero volts, each 180 degrees out of phase. A peak positive voltage 56 in one 54 corresponds with a negative trough 57 in the other 55.

Note that the method and apparatus for supplying power is not limited to use with any particular envelope or combination of multiple envelopes, and may be adapted as needed to create the desired envelope across the load. The envelope may also ramp gradually up and down if desired. For example, the DC-biased sine wave of FIG. 4A may begin with an amplitude of 20 volts and ramp up to 1000 volts or higher (i.e., thousands of volts) over some time period such as, for example, 10 seconds.

Figure 5:
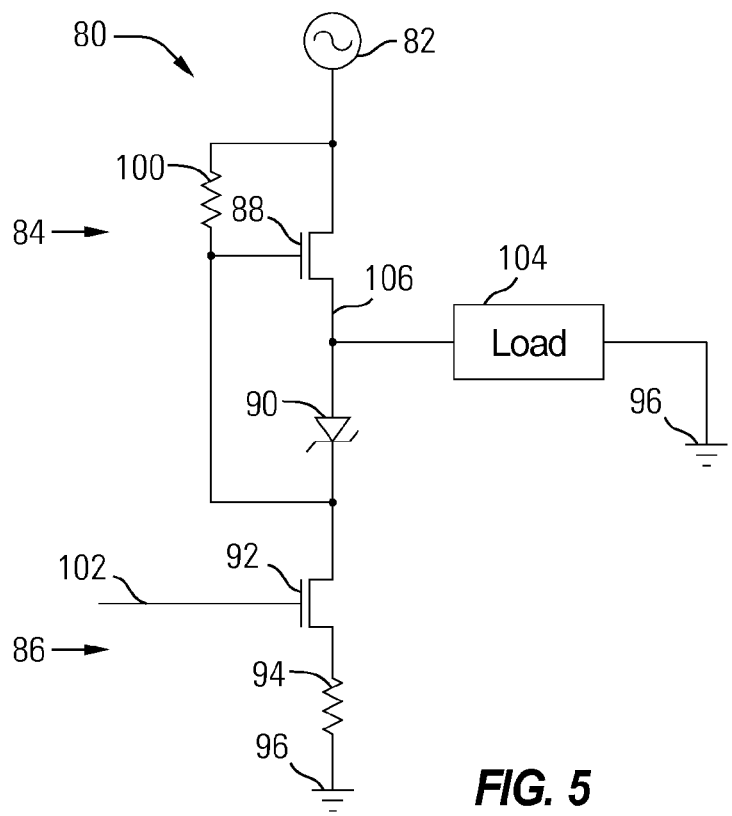
FIG. 5 is an exemplary circuit for a driver with a half-bridge network.

Referring now to FIG. 5, an exemplary circuit for a 1000 volt driver 80 with a half-bridge network will be described. A power source 82 provides a voltage of about 1000 volts with any desired waveform, such as an AC sine wave with a DC bias. A high-side portion 84 and low-side portion 86 of the driver 80 correspond roughly with the high-side and low-side switches 44 and 46, respectively, of FIG. 2, although as will be discussed. A high-side transistor 88 is connected to the power source 82, followed in series by a Zener diode 90, a low-side transistor 92, and a resistor 94, before connecting to ground 96. The transistors 88 and 92 of the exemplary circuit comprise n-channel metal oxide semiconductor field-effect transistors, or NMOS transistors. (Note that this circuit could also be constructed for a negative polarity operation using p channel field effect transistors (FETs) or positive and/or negative operation using both p and n channel FETs.) The drain of the high-side transistor 88 is connected to the power source 82, and the source is connected to the anode of the Zener diode 90. The drain of the low-side transistor 92 is connected to the cathode of the Zener diode 90, and the source is connected to the resistor 94. Another resistor 100 is connected at one end to the power source 82 and at the other end to the gate of the high-side transistor 88 and the node between the Zener diode 90 and the low-side transistor 92. A control input 102 is connected to the gate of the low-side transistor 92, and a load 104 is connected between ground 96 and the output node 106 between the high-side transistor 88 and the Zener diode 90.

In one exemplary embodiment using discrete components, the transistors 88 and 92 may each comprise suitable discrete 1000 volt NMOS transistors, available from a number of vendors. The Zener diode 90 may comprise any suitable Zener with a reverse breakdown voltage (voltage rating) larger than the threshold of the NMOS transistor. Any suitable range Zener diode may be used. The high-side resistor 100, depending on the application and use, may comprise a high value resistor such as a 1 Megohm or 10 Megohm watt resistor. The low-side resistor 94 may comprise a low value resistor, again depending on the application, such as a 10 ohm to few hundred ohm resistor. These values are to be understood to be possible values for certain applications; higher and lower values may be used as dictated and required for a particular application including both low and high voltage, low and high power applications.

In another exemplary embodiment, the driver 80 may be fabricated as an integrated circuit. In order for the transistors to handle the high voltages in this and other exemplary embodiments, whether using discrete components or as part of an integrated circuit, the transistors may be stacked to divide the voltage across multiple transistors, as will be discussed with reference to other exemplary embodiments below. One suitable method of stacking transistors to divide the high voltages is described in a U.S. Patent Application entitled "Processes and Packaging for High Voltage Integrated Circuits, Electronic Devices, and Circuits" of Laurence P. Sadwick et al., filed Sep. 29, 2006, which is incorporated herein by reference for all that it discloses.

During operation, the driver 80 sources current to the load 104 when the low-side transistor 92 is turned off by the control input 102. During this phase of operation, no current flows through the low-side transistor 92. The high-side transistor 88 is turned on by the gate resistor network to a Vgs voltage value greater than the threshold voltage of the transistor and is limited and supported by the Zener diode 90, allowing current to flow from the power source 82, through the high-side transistor 88 and through the load 104. The current through the relatively high impedance load 104 is limited primarily by the resistance of the load 104 and the voltage and current sourcing capacity of the power source 82. If a low impedance load is being driven, an appropriate means of current limitation may be added as desired.

During the second phase of operation, the low-side transistor 92 is turned on by the control input 102. As current flows through the Zener diode 90 and the low-side transistor 92, the Zener diode 90 is forward biased and Vgs of the high-side transistor 88 is about –0.7 volts, turning off the high-side transistor 88 for an enhancement transistor for the particular embodiment shown in the figure. It should be understood that appropriate modifications can be made to the particular embodiment presented for this invention to use, for example, n channel depletion MOSFETs and p channel depletion and/or enhancement MOSFETs. These MOSFETs can be made from any suitable semiconductor based materials system including but not limited to silicon, silicon on insulator (SOI), silicon carbide, III-V semiconductors, etc. In this particular embodiment, a small current flows from the power source 82, through the high-side resistor 100, the low-side transistor 92 and the low-side resistor 94. The current through the driver 80 during this phase of operation is limited primarily by the resistance of the high-side resistor 100, keeping the Zener diode 90 forward biased so that the high-side transistor 88 remains off. During this phase of operation, no significant current flows through the load 104.

Current may be directed continuously through the load 104 by keeping the low-side transistor 92 turned off by the control input 102 and thus turning on the high side transistor in the present embodiment. Alternatively, the duty cycle of the current through the load 104 may be varied by alternately turning the low-side transistor 92 on and off with the control input 102, turning current through the load 104 off and on. In one exemplary embodiment, a pulse width or pulse code modulated signal is applied to the control input 102 to vary the duty cycle through the load 104. For example, if the power source 82 is providing a sine wave at 50 kHz and a pulse width modulated (PWM) signal of typically a few Hz to around 1 kHz is applied to the control input 102, 50 sine waves will cycle on the input power source 82 during each period of the PWM signal. To fully drive the load 104, the duty cycle of the PWM signal is set to 0% so that the low-side transistor 92 is always turned off, allowing the current to flow through the load 104 rather than being pulled down to ground 96. To turn off the current through the load 104, the duty cycle of the PWM signal is set to 100% to always turn on the low-side transistor 92. (Note that the power source 82 could also be turned off, but assuming that the same power source 82 is supplying other drivers and loads, that would turn off the current to all loads. In contrast, the control input 102 may be used to independently control just one driver.) Generally speaking, to set the duty cycle through the load 104 to 90% of peak, the width of the pulse is set to 10% of the PWM period so that the pulse turns on the low-side transistor 92 during 5 of each 50 sine waves from the power source 82.

Note that the frequencies of the current from the power source 82 and the signal applied to the control input 102 may be set to any desired frequency. Similarly, the PWM control signals may have any desired period and frequency. For example, the frequency may be set at about 100 Hz to be just above the 50 or 60 Hz frequencies of many power grids.

The low-side resistor 94 is included to monitor current through the load 104 for certain applications and uses. Alternatively a resistor of suitable value for the particular application may be attached to the load (typically on the low side of the load) to monitor the current through individual loads, a subset of the loads, or the total load.

Figure 6:
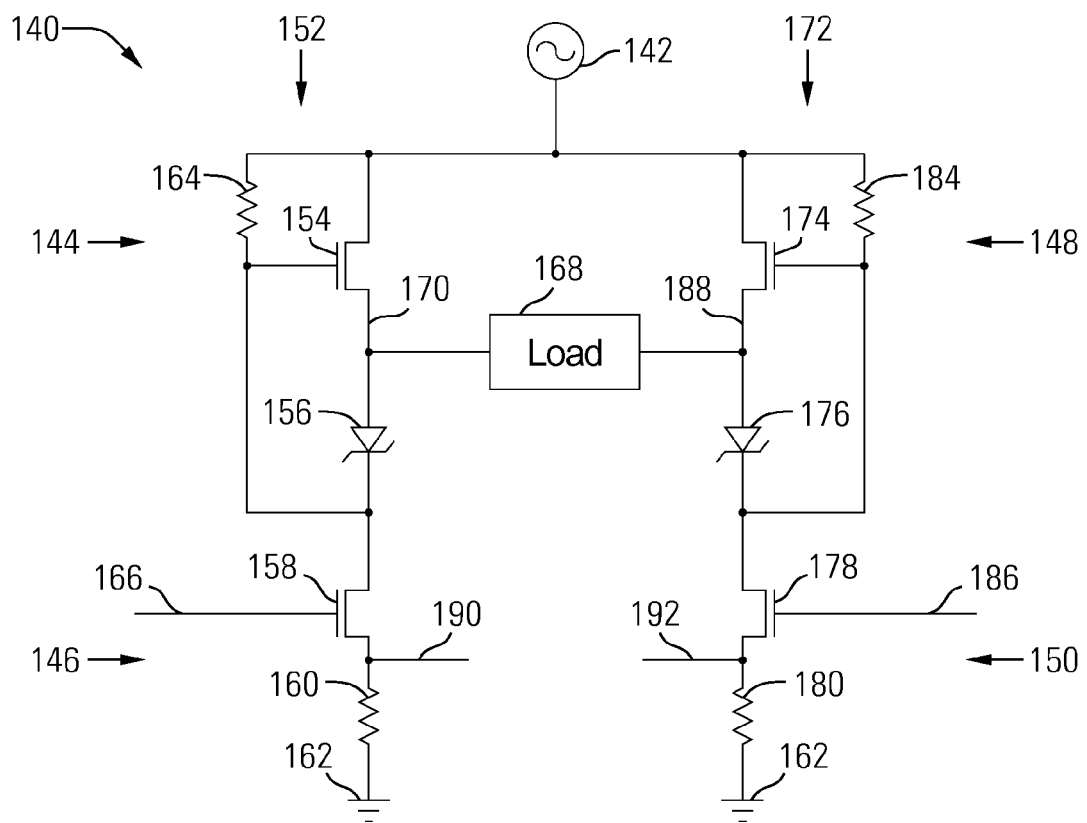
FIG. 6 is an exemplary circuit for a driver with a full-bridge network.

Referring now to FIG. 6, an exemplary circuit for a 1000 volt driver 140 with a full-bridge network will be described. A power source 142 provides a voltage of about 1000 volts with any desired waveform, such as an AC sine wave with a DC bias. A left high-side portion 144 and left low-side portion 146 of the driver 140 correspond roughly with the left high-side and low-side switches 62 and 66, respectively, of the exemplary block diagram of FIG. 3, and a right high-side portion 148 and right low-side portion 150 correspond roughly with the right high-side and low-side switches 64 and 68, respectively, although the functionality is not necessarily simply divided as in FIG. 3. On the left side 152 of the driver 140, a high-side transistor 154 is connected drain first to the power source 142, followed in series by a Zener diode 156 (anode first), a low-side transistor 158 (drain first), and a low-side resistor 160, before connecting to ground 162. A high-side resistor 164 is connected at one end to the power source 142 and at the other end to the gate of the high-side transistor 154 and to the node between the Zener diode 156 and the low-side transistor 158. A control input 166 is connected to the gate of the low-side transistor 158, and a load 168 is connected at one end to the output node 170 between the high-side transistor 154 and the Zener diode 156.

On the right side 172 of the driver 140, a high-side transistor 174 is connected drain first to the power source 142, followed in series by a Zener diode 176 (anode first), a low-side transistor 178 (drain first), and a low-side resistor 180, before connecting to ground 162. A high-side resistor 184 is connected at one end to the power source 142 and at the other end to the gate of the high-side transistor 174 and to the node between the Zener diode 176 and the low-side transistor 178. A control input 186 is connected to the gate of the low-side transistor 178, and the load 168 is connected at another end to the output node 188 between the high-side transistor 174 and the Zener diode 176. The load 168 is thus connected between the output nodes 170 and 188 of the two sides 152 and 172 of the full-bridge driver 140. In this exemplary embodiment, the transistors 154, 158, 174 and 178 comprise NMOS transistors. Again, it is understood that PMOS or CMOS transistors could be used in these novel inventive circuits. The circuit may be modified as desired to utilize other types of transistors or switches. As with other embodiments described herein, the method and apparatus for supplying power may be fabricated using discrete parts, as an integrated circuit, or a combination thereof.

The driver 140 operates in two phases to drive current through the load 168 alternately from either direction. In the first phase, the left high-side portion 144 of the driver 140 sources current to the load 168 and the right low-side portion 150 sinks current from the load 168 to ground 162. In the second phase, the right high-side portion 148 of the driver 140 sources current to the load 168 and the left low-side portion 146 sinks current from the load 168 to ground 162. To enter the first phase, the left control input 166 turns off the left low-side transistor 158 and the right control input 186 turns on the right low-side transistor 178. On the left side 152, when the low-side transistor 158 is turned off, the high-side transistor 154 is turned on as described above with respect to FIG. 5, allowing current to flow from the power source 142 to the load 168. On the right side 172 of the driver 140, when the low-side transistor 178 is turned on, current flows through the now forward biased Zener diode 176, setting in conjunction with the gate resistor network the Vgs of the high-side transistor 174 at about −0.7 volts and turning off the high-side transistor 174. Thus, the left low-side portion 146 and the right high-side portion 148 of the driver 140 are turned off. Current flows from the power source 142 through the left high-side transistor 154, the load 168 and the right low-side transistor 178 to ground 162.

During the second phase, the right control input 186 turns off the right low-side transistor 178, thereby turning on the right high-side transistor 174. The left control input 166 turns on the left low-side transistor 158, turning off the left high-side transistor 154. Current flows from the power source 142, through the right high-side transistor 174, the load 168, the left Zener diode 156, the left low-side transistor 158 and the left low-side resistor 160 to ground 162.

To provide a 1000 volt full-bridge driver, the same exemplary parts used in the circuit of FIG. 5 may be used, such as the 1000 volt NMOS transistors available from a number of vendors. Note that each side of the full-bridge driver 140 may be symmetrical and use identical parts, or may use different parts if desired.

As with the exemplary half-bridge driver 80 of FIG. 5, the load 168 may be fully powered or may be partially powered as desired. Because each driver (e.g., 80 and 140) connected to a power source (e.g., 82 and 142) enables independent control of the power supplied to the load, multiple drivers and loads may be connected to a single power source having a single transformer, and the current through each load (e.g., 104 and 168) may be independently controlled. With the exemplary full-bridge driver 140 of FIG. 6, the load 168 may be fully driven by applying two PWM signals to the control inputs 166 and 186, each 180 degrees out of phase, so that one of the control inputs 166 and 186 is always low to turn off its associated low-side transistor 158 or 178 while the other is high. To lower the total current through the load 168, the duty cycle of the PWM signals is increased so that both the low-side transistors 158 and 178 are turned off at the same time for a portion of the PWM period. Alternatively, the duty cycle of both PWM signals may be decreased so that both the low-side transistors 158 and 178 are turned on at the same time for a portion of the PWM period. Note that the duty cycle of the PWM signals does not have to be balanced or equal. Asymmetrical current flow may be generated by driving the current primarily from one end of the load 168, for example by setting the duty cycle of the left PWM signal to 75% and that of the right to 25%, still ensuring that one is always on while the other is off for full illumination but steering the current to one side 75% of the time. To turn the current through the load 168 off, both control inputs 166 and 186 may be set to the same state for the full PWM period, either high or low, to turn off their associated low-side transistors 158 and 178. With two supplies running 180 degrees out of phase with respect to each other, the inputs to each side are inverted with respect to each other (i.e., one input at high and the other input at low). Note that the PWM signals do not have to be synchronized with the power supply unless required by the load or, for example, the application. Unless there is some requirement for a particular load or application to avoid that situation, the PWM signals may be asynchronous with respect to the input power from the power supply. This has the result that the input wave from the power source 142 may be switched in the middle of its waveform so that it changes direction into the load mid-cycle.

Current through the load 168 may be monitored by the low-side resistors 160 and 180. Current monitors (not shown) may be connected to current monitor nodes 190 and 192 to measure the voltage across the low-side resistors 160 and 180. Current monitors may comprise any device or technique to measure voltage across the low-side resistors 160 and 180, whether now known or developed in the future. The current may also be monitored at other locations in the driver 80, such as the high-side of the driver or in series with the load. Current may alternatively be monitored using external monitors, such as, for example, inductively coupled coils.

Figure 7:
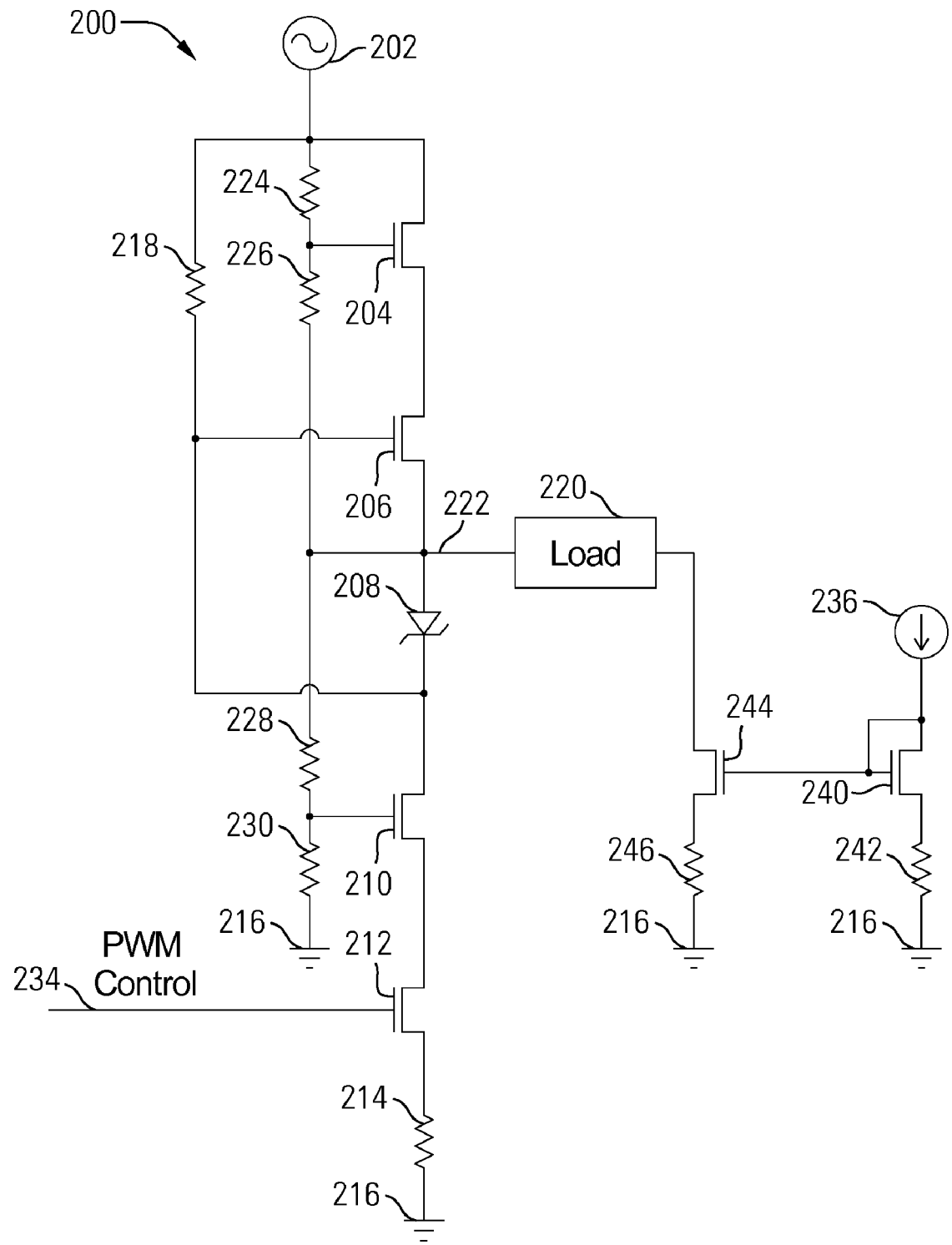
FIG. 7 is an exemplary circuit for a driver with a half-bridge network with stacked transistors.

Referring now to FIG. 7, an exemplary driver 200 will be described that provides for higher voltages by stacking transistors and for analog current control as well as digital duty cycle control. A power source 202 provides a voltage of about 2000 volts with any desired waveform, such as an AC sine wave with a DC bias or other exemplary waveforms to be discussed below. A top high-side transistor 204 is connected to the power source 202, followed in series by a bottom high-side transistor 206, Zener diode 208 (anode first), a top low-side transistor 210, a bottom low-side transistor 212 (all transistors drain first) and an optional low-side resistor 214, before connecting to ground 216. The optional low-side resistor 214 may be included if desired, based on the application, to monitor the current through the low side of the driver 200. The top high-side transistor 204 and top low-side transistor 210 are added to the stack to divide the higher voltage across the transistors. Thus, a 2000 volt power source 202 may be used with the same 1000 volt NMOS transistors without causing them damage. Note again that the method and apparatus for supplying power is not limited to use with any particular type or voltage rating of transistor or switch. Transistors, either discrete or integrated, may be stacked as desired based on the voltage requirements.

A high-side resistor 218 is connected at one end to the power source 202 and at the other end to the gate of the bottom high-side transistor 206 and to the node between the Zener diode 208 and the top low-side transistor 210. A load 220 is connected at one end to the output node 222 between the bottom high-side transistor 206 and the Zener diode 208 and at the other end to ground 216. A voltage divider chain made up of four resistors 224, 226, 228, and 230 balances the voltages applied to the gates of the transistors 204, 206, 210 and 212. In one exemplary embodiment, the resistors 224-230 of the voltage divider chain are of equal resistance. A high resistance, such as 10 Megohms, will limit the current through the voltage divider chain. Alternatively, various resistances may be selected to match the breakdown voltages of the transistors, applying the desired voltage levels to the gates of the transistors.

The first resistor 224 is connected between the power source 202 and the gate of the top high-side transistor 204. The second resistor 226 is connected between the gate of the top high-side transistor 204 and the output node 222. The third resistor 228 is connected between the output node 222 and the gate of the top low-side transistor 210. The fourth resistor 230 is connected between the gate of the top low-side transistor 210 and ground 216.

During one phase of operation, the bottom low-side transistor 212 is turned off so that current flows through the load 220 and the output node 222 is at about the same voltage level as that of the power source 202, or, in this particular example, 2000 volts. The third and fourth resistors 228 and 230 will divide the voltage at the output node 222 in half, applying about 1000 volt to the gate of the top low-side transistor 210. Because the bottom low-side transistor 212 is turned off, the top low-side transistor 210 will not be carrying any appreciable current and the source of the top low-side transistor 210 will be about 1000 volts, the same voltage as at the gate, also turning off the top low-side transistor 210. Thus, the voltage across each of the low-side transistors 210 and 212 is about 1000 volts, splitting the 2000 volt potential equally. Again, with different resistances in the voltage divider chain, different voltages can be applied across the transistors 204, 206, 210 and 212 in the driver 200. When the bottom low-side transistor 212 is turned off and the voltage at the output node 222 is about 2000 volts, the voltages on the top gates will be such that the two top transistors 204 and 206 are turned on resulting in an output voltage that is only a few volts less than the voltage of the power source. Thus the output voltage will be nearly 2000 volts. Typically a threshold turn on voltage is dropped across each of the gates of 204 and 206 under this condition resulting in an output voltage that is not exactly equal to but close to the voltage of the power minus 2 times the threshold voltage or, for this particular example, 2000 volts minus approximately 2 times the threshold voltage.

During another phase of operation, the bottom low-side transistor 212 is turned on and the bottom high-side transistor 206 will be turned off as described above. The output node 222 will be close to 0 v, being raised slightly above 0 volts primarily by the voltage potential across the Zener diode 208, the low-side transistors 210 and 212 and the low-side resistor 214. Under this condition, the voltage at the bottom of resistor 226 is only a few volts above ground (basically equal to the threshold turn on voltage) and the gate of transistor 206 is below the threshold turn on voltage resulting in equal voltage drops across transistors 204 and 206 with both transistors 204 and 206 being turned off and supporting, for this particular example, approximately 1000 volts across each transistor (i.e., 204 and 206).

As with previous exemplary embodiments, the driver 200 may be individually controlled by a signal applied to the gate of the bottom low-side transistor 212. All drivers connected to the power source 202 may also be simultaneously controlled by adjusting the voltage and/or current from the power source 202. In this exemplary embodiment, the driver 200 provides both digital duty cycle control by applying a PWM control signal 234 and analog current control by adjusting a reference current from a current supply 236. The PWM control signal 234 may be applied to the gate of the bottom low-side transistor 212. It is to be understood that either the PWM or the analog control could be used, designed, and/or implemented separately depending on a particular application. Again, the exemplary embodiments herein comprise NMOS transistors, but the drivers could alternatively use other types of switches or transistors, including PMOS transistors, junction field effect transistors (JFETs), bipolar junction transistors (BJTs), etc. The PWM control signal 234 operates as described in the exemplary embodiment of FIG. 5. To turn on the bottom low-side transistor 212, the PWM control signal is brought up to a positive voltage greater or equal to the threshold turn on voltage of the bottom low-side transistor 212 plus the voltage drop across the bottom low-side resistor 214. To turn off the bottom low-side transistor 212, the PWM control signal is brought back to ground potential or to a potential near that between the bottom low-side transistor 212 and the bottom low-side resistor 214. Note that the term "ground" used herein does not refer to any specific potential such as earth ground, but may refer to any low potential relative to the circuit, causing the circuit to function as described herein. Note also that the terms "input" and "output" are used generically herein with respect to various terminals of transistors, and either may refer to the drain, source, collector, emitter, etc, of any transistor. For example, the term "input" may be used herein to refer to either the drain or source of an NMOS transistor and does not necessarily indicate the direction of current flow.

Analog current control is provided using a reference current from a current supply 236 that may be connected at any desired location in the path through the load 220, such as between the load 220 and ground 216. A transistor 244 and resistor 246 are placed, for example, between the load 220 and ground 216. The drain of a current mirror transistor 240 is connected to the current supply 236. The gate of the current mirror transistor 240 is connected to the drain of the current mirror transistor 240 and the gate of the transistor 244. A current limiting resistor 242 is connected between the source of the current mirror transistor 240 and ground 216. The current through the transistor 244 is proportionally limited to that flowing through the current mirror transistor 240 from the current supply 236. The current supply 236 may be provided and adjusted using any means now known or that may be developed in the future. Current through the load may alternatively be proportionally limited by a current mirror (not shown) connected between the load 220 and ground 216. Note, in this example, that additional transistors may be stacked to support larger voltages than 2000 volts or to support the same voltage if the transistors are rated at lower voltages than 1000 volts each.

Figure 8:
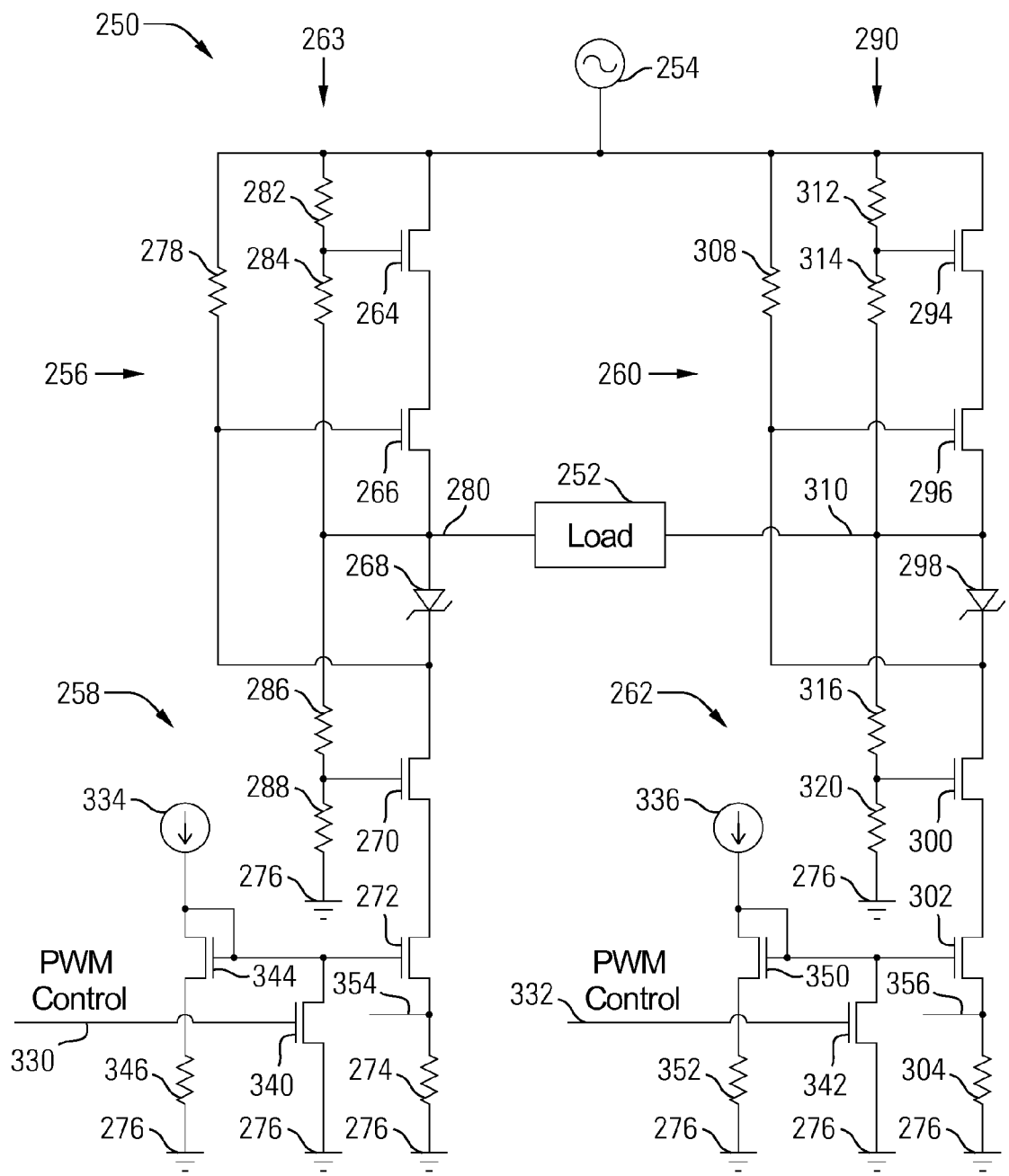
FIG. 8 is an exemplary circuit for a driver with a full-bridge network with stacked transistors and analog current control.

Referring now to FIG. 8, an exemplary full-bridge driver 250 with stacked transistors and multiple means of controlling the current through a load 252 is described. An exemplary power source 254 provides a voltage of about 2000 volts with any desired waveform. As with previous exemplary embodiments, collective control of the voltage and/or current is available at the power supply level for all attached drivers by controlling the power source 254. The driver 250 also provides independent driver-level digital duty cycle control using PWM control signals. In addition, this exemplary embodiment provides driver-level analog current control via reference currents. A left high-side portion 256 and left low-side portion 258 of the driver 250 correspond roughly with the left high-side and low-side switches 62 and 66, respectively, of the exemplary block diagram of FIG. 3, and a right high-side portion 260 and right low-side portion 262 correspond roughly with the right high-side and low-side switches 64 and 68, respectively, although the functionality is not neatly divided as in FIG. 3.

On the left side 263, a top high-side transistor 264 is connected to the power source 254, followed in series by a bottom high-side transistor 266, Zener diode 268 (anode first), a top low-side transistor 270, a bottom low-side transistor 272 (all transistors drain first) and a current monitor resistor 274 before connecting to ground 276. The top high-side transistor 264 and top low-side transistor 270 are added to the stack to divide the higher voltage across the transistors as described above with reference to FIG. 7. Thus, a 2000 volt power source 202 may be used with, as an example, stacked 1000 volt NMOS transistors. Again, higher or lower voltage rated transistors may be used depending on the exact particulars of a given application and situation.

A high-side resistor 278 is connected at one end to the power source 254 and at the other end to the gate of the bottom high-side transistor 266 and to the node between the Zener diode 268 and the top low-side transistor 270. The load 252 is connected at one end to the output node 280 between the bottom high-side transistor 266 and the Zener diode 268. A voltage divider chain made up of four resistors 282, 284, 286, and 288 balances the voltages applied to the gates of the transistors 264 and 270. In one exemplary embodiment, the resistors 282-288 of the voltage divider chain are of equal resistance. A high resistance, such as 10 Megohms, will limit the current through the voltage divider chain. Alternatively, various resistances may be selected to match the particulars including the voltages of the transistors, applying the desired voltage levels to the gates of the transistors.

The first resistor 282 is connected between the power source 254 and the gate of the top high-side transistor 264. The second resistor 284 is connected between the gate of the top high-side transistor 264 and the output node 280. The third resistor 286 is connected between the output node 280 and the gate of the top low-side transistor 270. The fourth resistor 288 is connected between the gate of the top low-side transistor 270 and ground 276. The voltages at the power source 254 and the output node 280 are divided by the resistors 282-288 of the voltage divider chain as described above with reference to the driver 200 of FIG. 7, keeping the voltage drop across each transistor below its breakdown voltage.

The right side 290 of the exemplary driver 250 is a mirror image of the left side 263, although the method and apparatus for supplying power is not limited to this configuration. Special objectives such as asymmetrical envelopes may be met by asymmetry in the full-bridge driver 250 if desired. A top high-side transistor 294 is connected to the power source 254, followed in series by a bottom high-side transistor 296, Zener diode 298 (anode first), a top low-side transistor 300, a bottom low-side transistor 302 (all transistors drain first) and a current monitor resistor 304, before connecting to ground 276. A high-side resistor 308 is connected at one end to the power source 254 and at the other end to the gate of the bottom high-side transistor 296 and to the node between the Zener diode 298 and the top low-side transistor 300. As described above, the load 252 is connected at one end to the left side output node 280 and is connected at the other end to the right side output node 310 between the bottom high-side transistor 296 and the Zener diode 298. A voltage divider chain made up of four resistors 312, 314, 316, and 320 generates the voltages for the gates of the stacked transistors 294 and 300 as on the left side 263 of the driver 250. The first resistor 312 is connected between the power source 254 and the gate of the top high-side transistor 294. The second resistor 314 is connected between the gate of the top high-side transistor 294 and the output node 310. The third resistor 316 is connected between the output node 310 and the gate of the top low-side transistor 300. The fourth resistor 320 is connected between the gate of the top low-side transistor 300 and ground 276.

As with various other exemplary embodiments described herein, the driver 250 may be individually controlled by signals applied to the gates of the bottom low-side transistors 272 and 302, and all drivers connected to the power source 254 may be controlled simultaneously by adjusting the voltage and/or current from the power source 254. In this exemplary embodiment, the driver 250 provides both digital duty cycle control by applying PWM control signals 330 and 332 and analog current control by adjusting reference currents from current supplies 334 and 336. On the left side 263 of the driver 250 a stealer transistor 340 is connected between the gate of the bottom low-side transistor 272 and ground 276 with the source at ground 276. The PWM control signal 330 is applied to the gate of the stealer transistor 340. When the stealer transistor 340 is turned on by the PWM control signal 330, it pulls the gate of the bottom low-side transistor 272 down to ground, turning it off. On the right side 290 of the driver 250 another stealer transistor 342 is connected between the gate of the bottom low-side transistor 302 and ground 276 with the source at ground 276. The PWM control signal 332 is applied to the gate of the stealer transistor 342. When the stealer transistor 342 is turned on by the PWM control signal 332, it pulls the gate of the bottom low-side transistor 302 down to ground, turning it off.

Analog current control is provided using reference currents from current supplies 334 and 336. On the left side 263 of the driver 250, the drain of a current mirror transistor 344 is connected to the current supply 334. The gate of the current mirror transistor 344 is connected to the drain of the current mirror transistor 344, the drain of the stealer transistor 340 and the gate of the bottom low-side transistor 272. A current limiting resistor 346 is connected between the source of the current mirror transistor 344 and ground 276. The current through the bottom low-side transistor 272 is proportionally limited to that flowing through the current mirror transistor 344 from the current supply 334. On the right side 290 of the driver 250, the drain of a current mirror transistor 350 is connected to the current supply 336. The gate of the current mirror transistor 350 is connected to the drain of the current mirror transistor 350, the drain of the stealer transistor 342 and the gate of the bottom low-side transistor 302. A current limiting resistor 352 is connected between the source of the current mirror transistor 350 and ground 276. The current through the bottom low-side transistor 302 is proportionally limited to that flowing through the current mirror transistor 350 from the current supply 336. Note that the bottom low-side transistors 272 and 302 are turned on by the current mirrors 344 and 350 and current limiting resistors 346 and 352, respectively, unless the stealer transistors 340 and 342 pull their respective gates down to ground 276.

During operation, the full-bridge driver 250 with stacked transistors operates much the same as the full-bridge driver 140 of FIG. 6. Some type of envelope or waveform is supplied by the power source 254, such as a sine wave with a DC bias. Note that any type of power source may be used depending on the requirements of the load, including a DC supply if desired. The PWM control signals 330 and 332 allow current to flow through the load 252 when one of the PWM control signals (e.g., 330) is on and the other (e.g., 332) is off. Maximum current that is balanced from each direction through the load 252 may be achieved by PWM control signals 330 and 332 each having a 50% duty cycle 180 degrees out of phase with the other. As noted above, the balance or percentage of time that current flows through the load 252 from a given direction may alternatively be increased by shifting the balance of the on-time toward one PWM control signal (e.g., 330). For example, one PWM control signal 330 may be on 70% of the PWM period with the other PWM control signal 332 on 30% of the PWM period, so that only one is on at any given time and that one or the other is always on. The overall current through the load 252 may also be reduced by turning both of the PWM control signals 330 and 332 on or off simultaneously for a portion of the duty cycle, either sinking current to ground 276 on both sides 263 and 290 of the driver 250 at the same time, turning off the high-side transistors 264, 266, 294 and 296 simultaneously and pulling both the output nodes 280 and 310 down, or by turning off the low-side transistors 270, 272, 300 and 302 simultaneously and allowing both the output nodes 280 and 310 to float up to the potential of the power source 254.

In addition to the digital duty cycle control in the driver 250 provided by the PWM control signals 330 and 332 and the stealer transistors 340 and 342, this exemplary embodiment of a full-bridge driver 250 provides analog current control at the driver level. The current through the bottom low-side transistors 272 and 302 is proportionally limited by the current through the current mirror transistors 344 and 350, respectively. Thus, by adjusting the reference currents from the current supplies 334 and 336, the current through the load 252 may be controlled, providing independent current control through the load on a driver-by-driver basis. During one phase of operation, with the left PWM control signal 330 on, the stealer transistor 340 will be turned on, turning off the left bottom low-side transistor 272. With the right PWM control signal 332 off, the stealer transistor 342 will be turned off, turning on the right bottom low-side transistor 302. Current will therefore flow from the power source 254, through the left high-side portion 256 of the driver 250, through the load 252, through the right low-side portion 262 of the driver 250 to ground 276. The current through the load 252 during this phase of operation will be proportionally limited by the reference current flowing through the right current mirror transistor 350. During the other phase of operation, with the left PWM control signal 330 off, the stealer transistor 340 will be turned off, turning on the left bottom low-side transistor 272. With the right PWM control signal 332 on, the stealer transistor 342 will be turned on, turning off the right bottom low-side transistor 302. Current will therefore flow from the power source 254, through the right high-side portion 260 of the driver 250, through the load 252, through the left low-side portion 258 of the driver 250 to ground 276. The current through the load 252 during this phase of operation will be proportionally limited by the reference current flowing through the left current mirror transistor 344.

The actual current levels needed in the current mirror transistors 344 and 350 for full current flow through the load is dependent on the waveform from the power source 254 and on the transistor characteristics. If the power source 254 and the current supplies 334 and 336 all generate a DC current, and the temperature and other characteristics of the current mirror transistors 344 and 350 and bottom low-side transistors 272 and 302 are identical, the currents in each side of the current mirrors would be equal. However, with an alternating waveform from the power source 254 and other potential variations in the transistor characteristics, the currents may be proportional rather than equal. Furthermore, the currents through the current mirror transistors 334 and 336 can be scaled as needed for example for a particular application to the current through the bridge. The current needed from the current supplies 334 and 336 may be calculated based on the waveforms and transistor characteristics, may be determined experimentally at design-time, may be actively adjusted by a control system, or may be manually adjusted during manufacture, operation, maintenance, or repair, etc.

The current supplies 334 and 336 may comprise any current source now known or that may be developed in the future, and may be adjustable by any means. For ease in describing the driver 250, DC current supplies 334 and 336 are shown. A DC reference current may be used even when the power source 254 is providing a sine wave or some variation thereof. If the current waveforms are not matched and/or, for example, synchronized, the currents though either side of each current mirror will be proportional rather than equal as discussed above. Alternatively, AC reference currents may be used with an AC power source 254 to generate various waveforms through the load 252 as desired, with the AC reference currents synchronized or not with the AC power source 254 as desired. Again, note that to match currents exactly, the characteristics and temperature of the current mirror transistors 344 and 350 should match those of the bottom low-side transistors 272 and 302. However, as noted above, proportional current control provides excellent control of the currents through each load (e.g., 252) using any type of control system to control the reference currents, whether currently known or developed in the future.

The reference currents through each current mirror 344 and 350 may be set to equal levels to balance the current levels flowing in each direction through the load 252, or may be unequal. For example, the current flowing into the load 252 from the left side 263 of the driver 250 may be set to a higher level than the current flowing into the load 252 from the right side 290 of the driver 250, causing the load 252 to be higher on one end than the other.

Current monitoring through the load 252 is provided by the current monitor resistors 274 and 304. Current monitors (not shown) may be connected to current monitor nodes 354 and 356 to measure the voltage across the current monitor resistors 274 and 304. Current monitors may comprise any device or technique to measure voltage, whether currently known or developed in the future. The exemplary current monitor resistors 274 and 304 may alternatively be replaced by any means for identifying the variation in voltage and/or current in the driver 250, such as one or more current mirror transistors. Again, the current may be monitored using any desired technique at any suitable location in the power supply.

The full-bridge driver 250 provides a number of substantial benefits. A power supply having a single power source 254, for example having a single transformer, may power multiple drivers (e.g., 250), each driving its own corresponding load 252. High voltages may be handled by the drivers by stacking transistors, whether discrete or integrated. Digital duty cycle control is provided by PWM control inputs, and analog current control is provided by reference currents, each on the driver level so that loads powered by a single power source may be independently controlled. The driver level digital and analog control is low voltage, despite the high voltage nature of the power supply, greatly simplifying control circuitry. The PWM control signals may comprise standard 3.3 volt or 5 volt digital signals, or any other voltage level as desired. Similarly, the analog current control may be provided by low voltage current supplies. Because the current mirrors are at the bottom end of the driver 250 near ground 276, a low power current mirror having a relatively low voltage may be used to control the higher power of the high voltage driver 250. The driver 250 also provides current monitoring through the load 252.

Various elements of the exemplary embodiments disclosed herein may be combined piecemeal as desired based on the requirements of the power supply and the loads. For example, current monitoring may or may not be omitted if desired. Transistors may be stacked as deeply as desired based on the breakdown voltages of the transistors and the voltage requirements of the load. Any number of half bridges or full bridges may be put in parallel provided the power source can support this number of parallel bridges.

Figure 9:
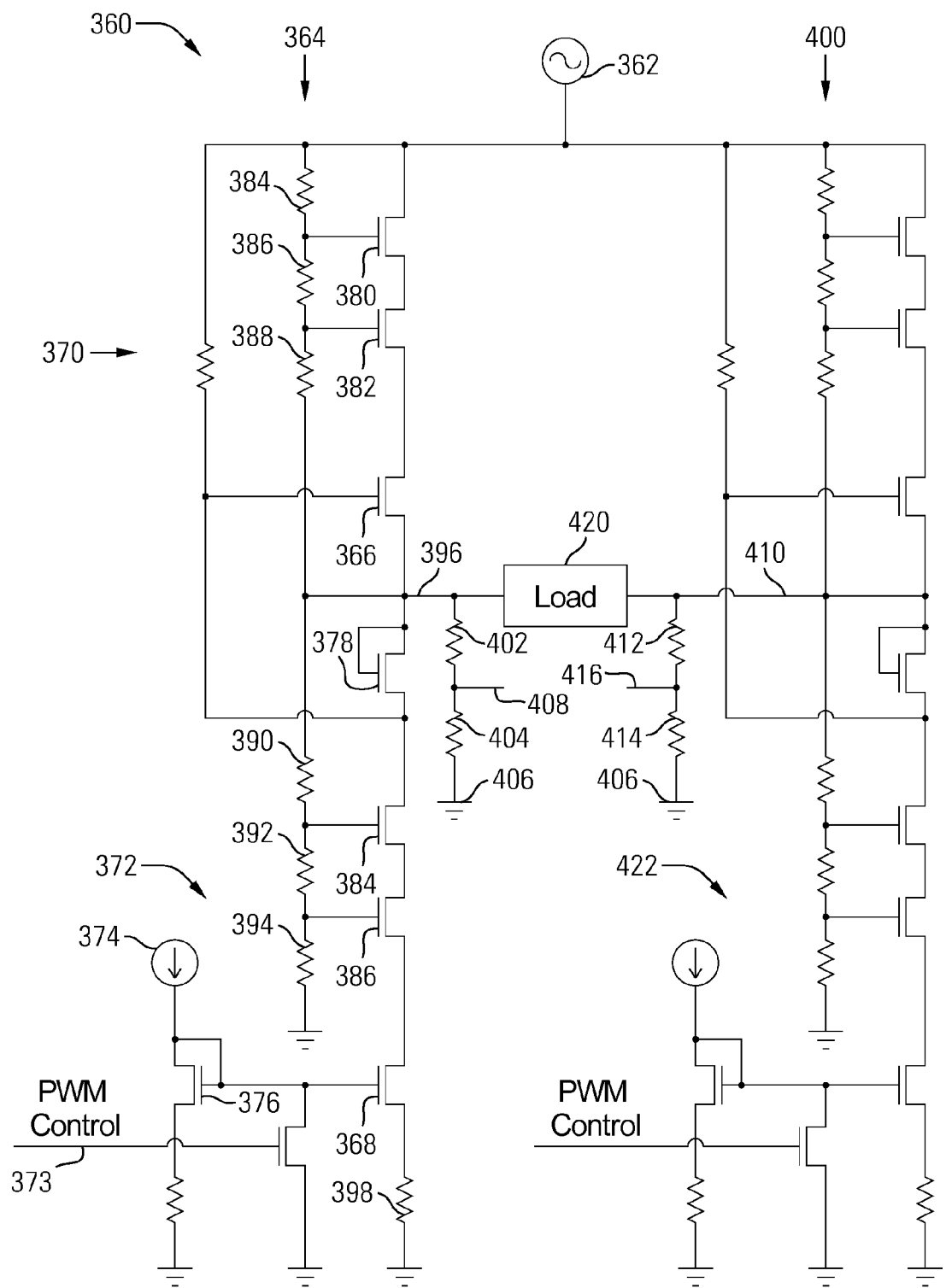
FIG. 9 is an exemplary circuit for a full-bridge network with additional stacked transistors, diode-connected transistors and output short detection.

Referring now to FIG. 9, an exemplary 3000 volt full-bridge driver 360 with diode-connected transistors and output short detection will be described. Generally, this driver 360 operates in the same manner as the exemplary driver 250 of FIG. 8. In order to handle a 3000 volt waveform from the power source 362, additional transistors are added to the stack, along with additional resistors in the voltage divider chain that biases each stacked transistor gate. The Zener diodes of previous exemplary embodiments are replaced with diode-connected transistors, and short detection voltage dividers are added to the outputs.

On the left side 364 of the driver 360, a primary high-side transistor 366 and low-side transistor 368 are used to switch the top 370 and bottom 372 halves of the driver on and off, as with previous embodiments. The bottom low-side transistor 368 is turned on and off by a PWM control signal 373 and is current limited by a reference current from a current supply 374 through a current mirror transistor 376. Additionally, the bottom high-side transistor 366 could be turned on and off by a diode-connected NMOS transistor 378 using the drain of transistor 378 to accomplish this in the same manner as the Zener diode (e.g., 268) of previous embodiments. Alternatively, any form or type of Zener diode or similar functioning device, circuit element or component could be used to achieve the same performance and effect. The higher 3000 volt input from the power source 362 is divided in the top half 370 across the bottom high-side transistor 366 and two additional stacked transistors 380 and 382. The 3000 volts is divided in the bottom half 372 across the bottom low-side transistor 368 and two additional stacked transistors 384 and 386. As described above, the 3000 volt potential is placed primarily across the top half 370 of the driver 360 during one phase of operation and primarily across the bottom half 372 of the driver 360 during the other phase of operation. A voltage divider chain made up of six resistors 384, 386, 388, 390, 392 and 394 generates the voltages used to bias the gates of the stacked transistors 380, 382, 384 and 386. Given equal resistances such as 10 Megohms, the 3000 volt input potential is evenly divided by the top three resistors 384, 386 and 388 during one phase of operation, and by the bottom three resistors 390, 392 and 394 during the other phase of operation.

During the first phase when current is flowing through the top half 370 of the driver 360 and the bottom half 372 of the driver 360 is switched off, very little voltage is placed across the top three resistors 384, 386 and 388 of the voltage divider chain and across the transistors 380, 382 and 366 of the top half 370 of the left side 364. Most of the 3000 volts from the power source 362 is placed across the bottom three resistors 390, 392 and 394 of the voltage divider chain and across the transistors 384, 386 and 368 of the bottom half 372 of the left side 364. Thus, the voltage at the upper end of the transistor 378 at the output node 396 will be at about 3000 volts, the voltage at the gate and source of the top low-side stacked transistor 384 will be at about 2000 volts, and the voltage at the gate and source of the bottom low-side stacked transistor 386 will be at about 1000 volts. Each transistor 384, 386 and 368 in the bottom half 372 of the driver 360 will thus each have a potential of about 1000 volts from drain to source.

During the second phase when current is flowing through the bottom half 372 of the driver 360 and the top half 370 of the driver 360 is switched off, much of the 3000 volts is placed across the top three resistors 384, 386 and 388 of the voltage divider chain and across the transistors 380, 382 and 366 of the top half 370 of the left side 364. Very little voltage is placed across the bottom three resistors 390, 392 and 394 of the voltage divider chain and across the transistors 384, 386 and 368 of the bottom half 372 of the left side 364. The voltage at the top of the voltage divider chain above resistor 384 will be about 3000 volts, the voltage at the gate and source of the top high-side stacked transistor 380 will be about 2000 volts, the voltage at the gate and source of the bottom high-side stacked transistor 382 will be about 1000 volts, and the voltage at the output node 396 will be near 0 volts plus whatever small voltage drops across the diode-connected transistor 378 (or, for example a Zener diode), the transistors 384, 386 and 368 of the bottom half 372, and the current monitor resistor 398. Each transistor 380, 382 and 366 in the top half 370 of the driver 360 will thus have a potential of about 1000 volts from drain to source across each of them. The transistor stacking and biasing operates in the same manner in the right side 400 of the driver 360.

Short circuits, for example, may be detected in the driver 360 by monitoring the voltage at the output nodes 396 and 410 to indicate when the output voltage is pulled down before reaching the load 420. On the left side 364, a voltage divider made up of two resistors 402 and 404 is connected in series between the output node 396 and ground 406. A short detector (not shown) may be connected to the short detection output 408 between the two resistors 402 and 404 to measure the voltage of the output node 396. Any means for measuring the voltage at the short detection output 408 may be used as a short detector. The resistance of the two resistors 402 and 404 may be selected to provide an easily measurable voltage at the short detection output 408, given the voltage of the power source 362. For example, the resistance may be selected to scale the 3000 volts of the power source 362 down to 5 volts or 3.3 volts. On the right side 400, another voltage divider made up of two resistors 412 and 414 is connected between the right output node 410 and ground 406, with a short detection output 416 connected between the two resistors 412 and 414. During one phase of operation, one output node 396 should be at about 3000 volts (minus the voltage drop across the transistors 380, 382 and 366 in the top half 370 of the left side 364) and the opposite output node 410 should be at about 0 volts (plus the voltage drop across the various transistors and the resistor in the bottom half 422 of the right side 400). If the resistors 402, 404, 412 and 414 were selected to divide the 3000 volts down to 5 volts at the short detection outputs, the left short detection output 408 should be at about 5 volts and the right short detection output 416 should be at about 0 volts during normal operation. If both short detection outputs 408 and 416 drop to about 0 volts during normal operation with the power source 362 active and the PWM controls (e.g., 373) and reference currents set at the proper levels, the driver 360 may have a fault such as a short to ground and this can be detected and properly handled. The above is just one example of how to accomplish the short detection; it should be clear to anyone skilled in the art that there are numerous ways to accomplish the above. All of these are within the scope of the present invention.

Figure 10:
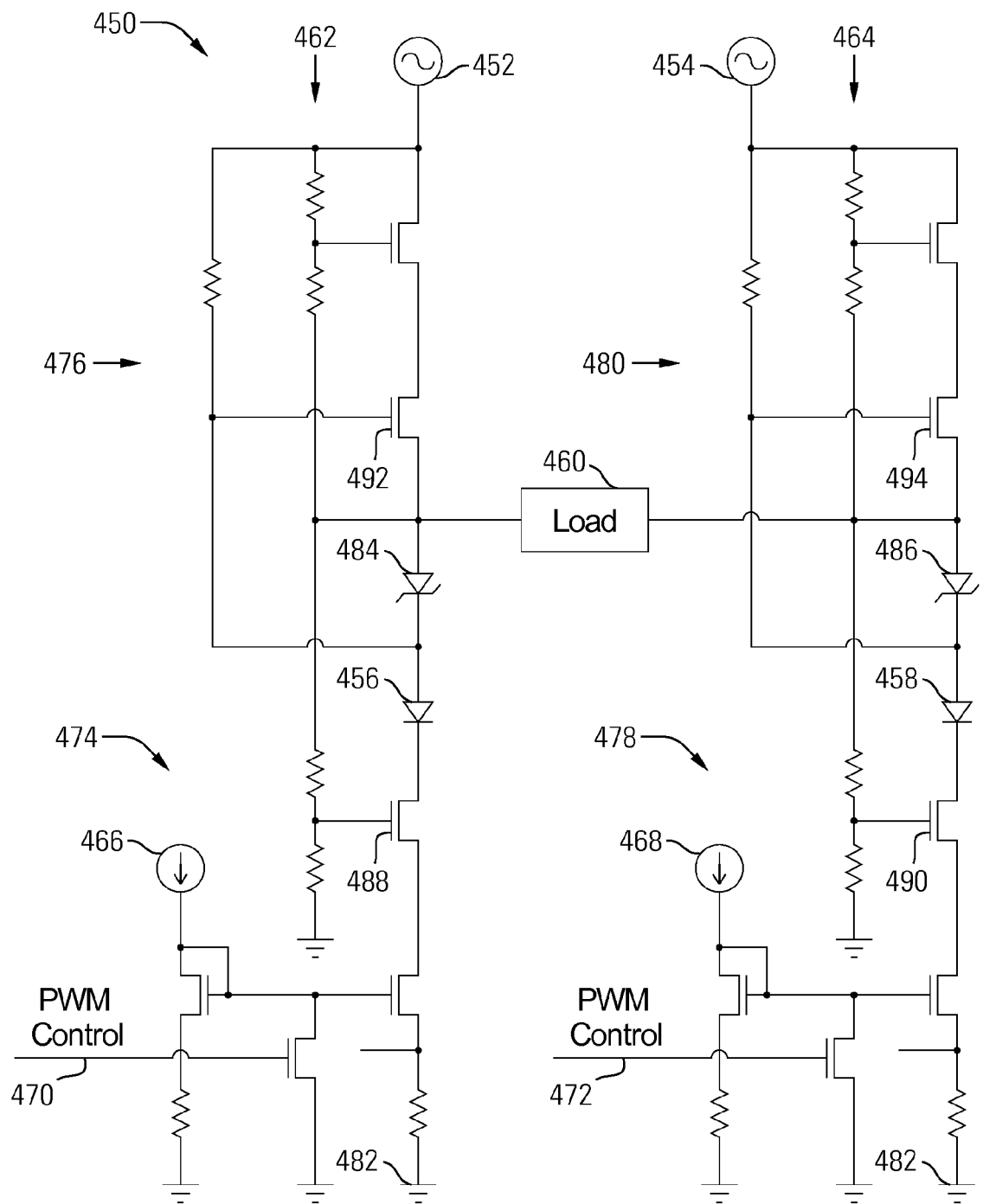
FIG. 10 is an exemplary circuit for a full-bridge network with dual high voltage power supplies and negative voltage protection diodes.

Referring now to FIG. 10, an exemplary full-bridge driver 450 with stacked transistors and dual high voltage power sources 452 and 454 will be described. The power sources 452 and 454 may supply any desired envelope or even a AC or DC current if desired, as described above. Exemplary waveforms that may be used with the driver 450 of FIG. 10 are illustrated in FIGS. 4C and 4D. The exemplary full-bridge driver 450 is also provided with negative voltage protection or AC driven waveform diodes 456 and 458 that both protect various transistors in the driver 450 if the voltage from the power sources 452 and 454 goes negative, such as with the waveforms of FIG. 4D or allow the negative portion of the waveform to pass to the output of the driver.

The exemplary driver 450 of FIG. 10 generally operates similarly to the other exemplary embodiments described above, such as those illustrated in FIGS. 6 and 8. Current is driven through a load 460 alternately by the two sides 462 and 464 of the driver 450. The current through the load 460 may be controlled by the power sources 452 and 454. The current through the load 460 may also be controlled in the driver 450 in analog fashion by adjusting reference currents from current sources 466 and 468 and in digital fashion by applying PWM control signals 470 and 472 to vary the duty cycle of the driver 450 as described above with respect to FIG. 8. If the envelope of FIG. 4C is applied to the driver 450, one phase 51 may be supplied by the left power source 462 with the other phase 52 supplied by the right power source 464. The PWM control signals 470 and 472 may be switched synchronously with the power sources 462 and 464 so that the direction of the current through the load 460 changes just when the waveforms 51 and 52 are transitioning to and from zero volts, thus potentially providing better efficiency in the load 460. Also, the PWM control signals 470 and 472 may be switched synchronously at the same frequency as the power sources 462 and 464, or they may be switched synchronously at a lower frequency. This lower frequency synchronous switching would effectively cut the duty cycle in half because only current from one power source (e.g., 462) would pass through the load 460 for a given state of the PWM control signals 470 and 472. In alternative embodiments, the PWM control signals 470 and 472 may be switched asynchronously with the power sources 462 and 464, chopping the waveforms 51 and 52 in a more arbitrary fashion.

An exemplary synchronous embodiment in which the PWM control signals 470 and 472 are switched at the frequency of the power sources 462 and 464 will now be described, with the waveform of FIG. 4C applied to the driver 450. The upper phase 51 of FIG. 4C is supplied by the left power source 462 and the lower phase 52 of FIG. 4C is supplied by the right power source 464. When the current 49 begins to flow from the left power source 462 and the right power source 464 is at ground 53 as illustrated at the origins of FIG. 4C, the left PWM control signal 470 is asserted to turn off the left low-side portion 474 and turn on the left high-side portion 476 of the driver 450. The right PWM control signal 472 is turned off, thereby turning on the right low-side portion 478 and turning off the right high-side portion 480 of the driver 450. Current 49 flows from the left power source 462 through the left high-side portion 476, the load 460, and the right low-side portion 478 to ground 482. When the left power source 462 returns to ground 50 and current begins to flow from the right power source 464, the right PWM control signal 472 is asserted to turn off the right low-side portion 478 and turn on the right high-side portion 480 of the driver, and the left PWM control signal 470 is turned off, thereby turning on the left low-side portion 474 and turning off the left high-side portion 476 of the driver 450. Current flows from the right power source 464 through the right high-side portion 480, the load 460 and the left low-side portion 474 to ground 482.

Note again that the use of dual power sources 462 and 464 enables the current through the load 460 to be shaped with various desired envelopes by setting the amplitudes or frequencies at different levels on each side.

In one exemplary embodiment, negative voltage protection diodes 456 and 458 are added anode-up between the Zener diodes 484 and 486 and the top stacked transistors 488 and 490, respectively, in the low-side portions 474 and 478 of the driver 450. If the power sources 462 and 464 go to negative voltages as illustrated in FIG. 4D, the negative voltage protection diodes 456 and 458 protect various transistors (e.g., 488, 490, 492 and 494) from damage that might otherwise be caused due to the parasitic diodes in those transistors. The negative voltage protection diodes 456 and 458 prevent current from flowing up through the low-side portions 474 and 478 of the driver 450 from ground 482 when the power sources 462 and 464 are at negative potentials. Note that if the envelope of FIG. 4D is applied, the peak positive voltage from the power supplies would be cut in half for a given transistor stack, because the maximum potential across the load 460 would be from positive peak to negative peak, doubling the potential with respect to positive-only embodiments described above. For example, given the same components, either a 2000 volt positive-only power source may be used or a 1000 volt positive to 1000 volt negative power source. Various other benefits may be realized by using a power source that provides both positive and negative voltages.

Figure 17:
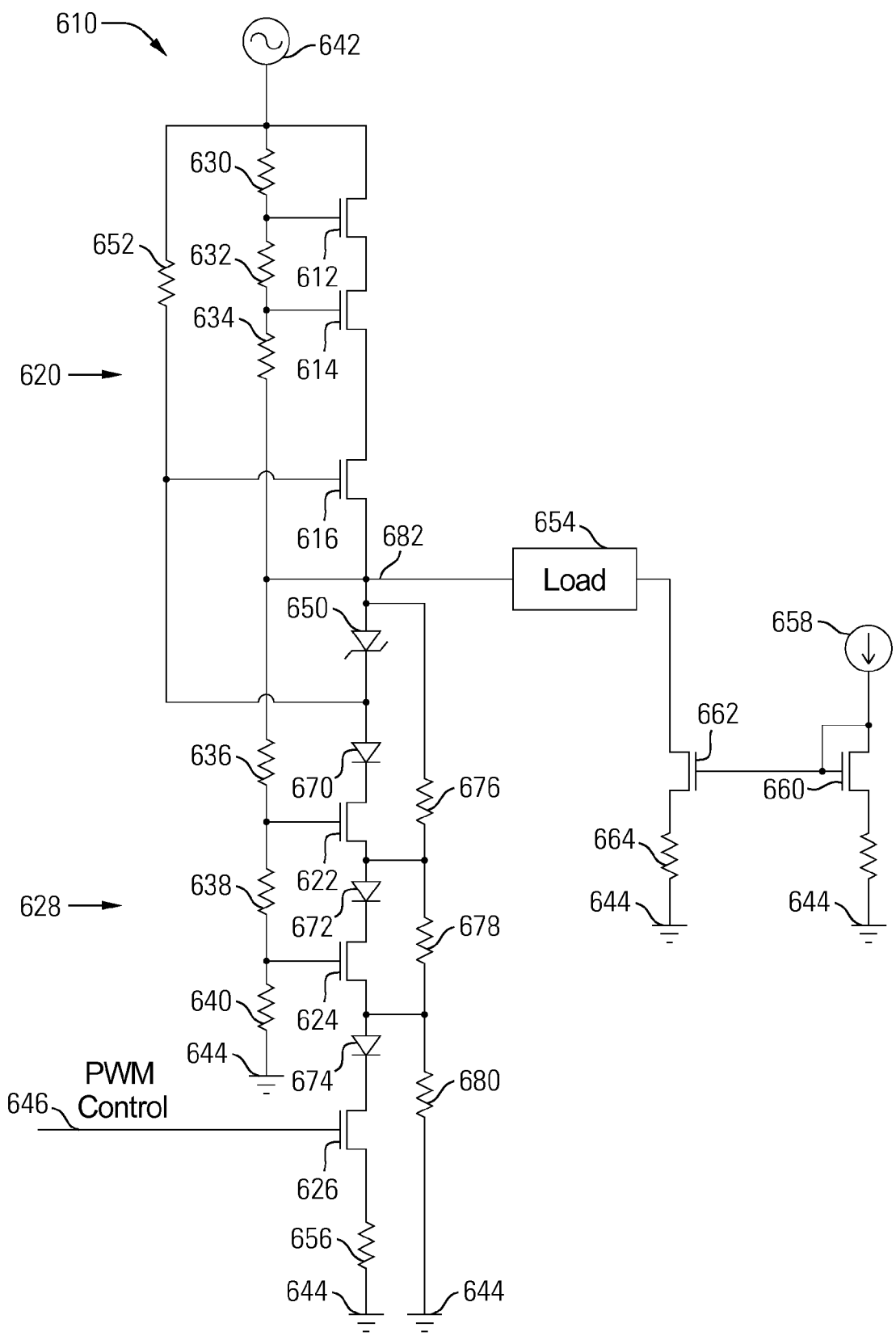
FIG. 17 is an exemplary circuit with a half-bridge rectifier for a full-wave rectified power source.

Referring now to FIG. 17, an exemplary half-bridge driver 610 adapted to use with negative and positive input envelopes as illustrated in FIG. 4D will be described. Three transistors 612, 614 and 616 are stacked in the high-side portion 620 and three transistors 622, 624 and 626 are stacked in the low-side portion 628. The transistors 612-616 and 622-626 are biased as described above with respect to FIG. 9 by a gate resistor network made up of six resistors 630, 632, 634, 636, 638 and 640 connected in series between the power source 642 and ground 644. Given the exemplary use of 1000 volt transistors, the driver 610 may have a potential of about 3000 volts across each portion 620 and 628 during different phases of operation. For example, the power source 642 may, for example, supply a sine wave of 0 to 3000 volts, either unrectified and DC biased as in FIG. 4A, or rectified as in FIG. 4B, or may supply a sine wave alternating between plus and minus 3000 volts as in element 54 of FIG. 4D. The driver 610 switches between phases of operation under control of a PWM control signal 646 generally as described above with respect to FIG. 7, using the bottom low-side transistor 626 in combination with a Zener diode 650 and high-side resistor 652 to switch the driver 610, either driving substantially the full current from the power source 642 through the load 654 or substantially turning off the current through the load 654 and allowing a trickle current through the low-side portion 628 of the driver to maintain control.

As described above with respect to FIG. 7, an optional current monitor resistor 656 may be connected between the bottom low-side transistor 626 and ground 644. A current monitor (not shown) may be used to measure the voltage drop across the optional current monitor resistor 656 if desired to measure the current through the low-side portion 628 of the driver 610. Proportional limiting control of the current through the load 654 may also be provided if desired using a reference current from a current supply 658 applied by a current mirror 660 and 662. The current mirror 660 and 662 may be placed at any location desired in the current path through the load 654, such as, for example, below the load 654 between the load 654 and ground 644. Current through the load 654 may also be monitored using an optional load current monitor resistor 664 placed in the current path through the load 654. Again, the current monitor resistor 664 may be placed at any desired location in the current path through the load 654, such as, for example, between the load 654 and ground 644. As is known, the voltage drop across the current monitor resistor 664 in this exemplary location may be measured with respect to ground using a single lead above the resistor 664. Alternatively, if the current monitor resistor 664 is placed in a different location, other techniques may be used to measure the voltage drop across the resistor 664, such as using a differential amplifier to compare the voltage above and below the resistor 664.

In this exemplary embodiment 610, distributed negative voltage protection diodes 670, 672 and 674 are included, allowing negative voltages from the power source 642 to reach the output 682 and protecting the transistors 612-616 and 622-626 from damage that might otherwise be caused by the effects of the negative voltages due to the parasitic diodes in those transistors. The negative voltage protection diodes 670, 672 and 674 prevent current from flowing up through the low-side portion 628 of the driver 610 from ground 644 when the power source 642 is at negative potentials. The anode of diode 670 is connected to the node between the cathode of Zener 650, the control input of the bottom high-side transistor 616 and the high-side resistor 652. The cathode of diode 670 is connected to the drain of the top low-side transistor 622. The anode of diode 672 is connected to the source of the top low-side transistor 622 and the cathode of diode 672 is connected to the drain of the middle low-side transistor 624. The anode of diode 674 is connected to the source of the middle low-side transistor 672 and the cathode of diode 674 is connected to the drain of the bottom low-side transistor 626. Additional negative voltage protection diodes may be added for additional stacked transistors, with one diode distributed in the driver 610 for each stacked transistor in this exemplary embodiment. Note that a single negative voltage diode may be included per side of the driver bridge as in FIG. 10, or the protection of the negative voltage diodes may be distributed by adding additional diodes as desired, up to and beyond one diode per transistor. Optional ballast resistors 676, 678 and 680 may be included to balance the voltage drop across the negative voltage protection diodes. The top ballast resistor 676 is connected at one end to the output node at the anode of the Zener 650 and at the other end to the anode of the middle protection diode 672, thereby extending protection to the Zener 650. Alternatively, the top ballast resistor 676 may be connected at the anodes of the top and middle protection diodes 672. The middle ballast resistor 678 is connected at one end to the anode of the top protection diode 672 and at the other end to the anode of the middle protection diode 674. The bottom ballast resistor 680 is connected at one end to the anode of the middle protection diode 674 and at the other end to ground 644.

Figure 11:
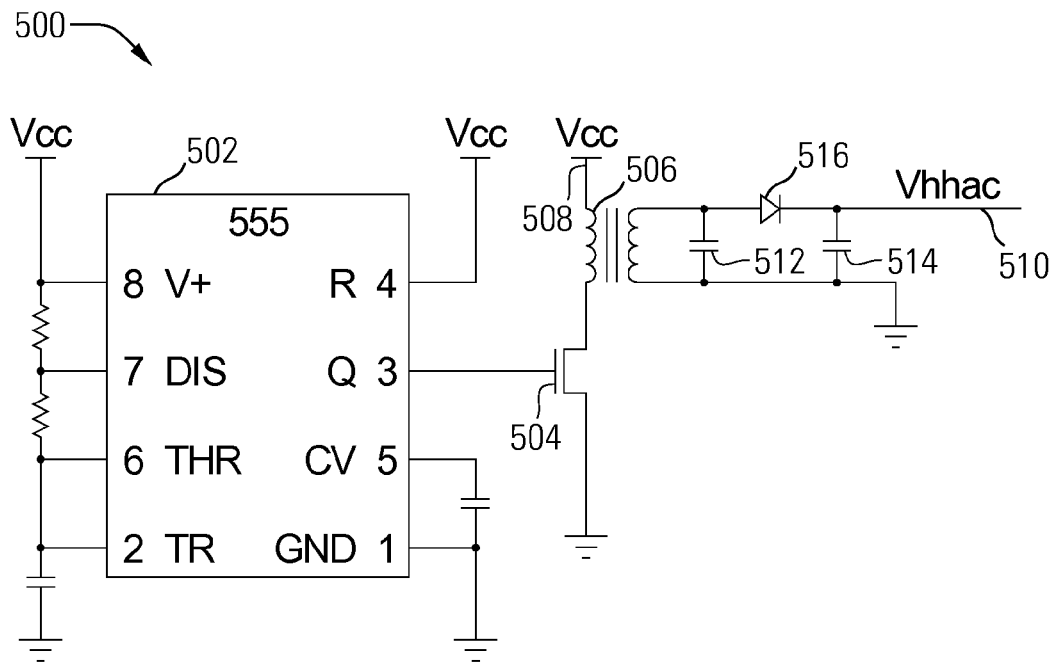
FIG. 11 is an exemplary circuit for a half-wave rectified power source with an NMOS transistor.
Figure 12:
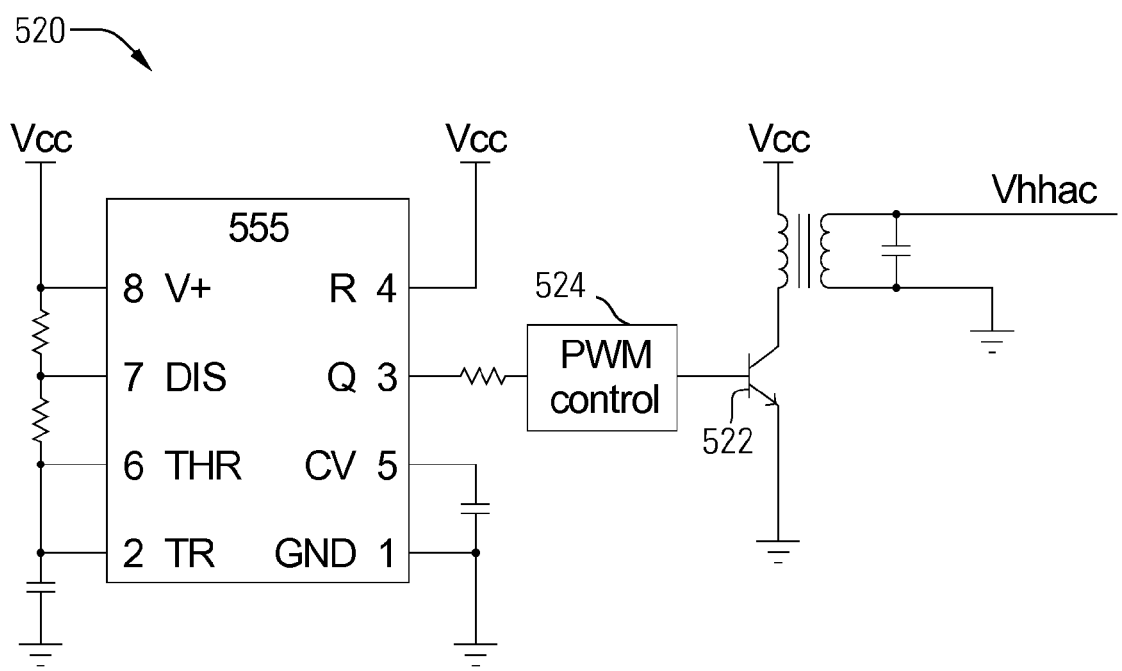
FIG. 12 is an exemplary circuit for a half-wave rectified power source with a BJT transistor.

Referring now to FIG. 11, an exemplary power source 500 that may supply current to a driver (e.g., 80, 140, 200, 250, 360 or 450) will be described. An oscillator such as, for example, a 555 timer 502 or other device is used to generate an alternating waveform such as a square wave or sine wave at any desired frequency. Any suitable oscillator may be used, such as a crystal oscillator, phase locked loop, Wein bridge, logic oscillator, operational amplifier oscillator, bridge oscillator, etc. A switch such as an NMOS transistor 504 applies the waveform generated by the 555 timer 502 to a transformer 506, converting the low voltage 508 input to a high voltage output 510. Filter capacitors 512 and 514 and other components may be added as needed across the secondary windings of the transformer 06 for filtering and resonant tuning to obtain the desired output waveform, but may not be necessary and should be viewed as optional. For example, a half-wave rectified sine such as that in one phase 51 of the waveform of FIG. 4C may be obtained by adding a diode 516 at the output 510. Referring now to FIG. 12, another exemplary power source 520 is illustrated using a BJT transformer 522 as the switching device. The power source is not limited to any particular device (e.g., 502) for generating a source waveform or to any switch or driver (e.g., 504, 522) for applying the waveform to a transformer (e.g., 506). In this exemplary embodiment, the diode 516 is omitted in order to produce a non-rectified full sine wave as in FIG. 4D. Note that some of the capacitors shown in these figures may be optional depending on the application and the particulars of the components used.

The power supplied by the power source may also be controlled globally for all outputs or drivers by pulse width modulating the power source using any suitable means in any suitable location. For example, a PWM control circuit 524 may be used to enable and disable the signal from the oscillator to the primary winding of the transformer. The PWM control circuit 524 may comprise any suitable circuit to apply pulse width modulation to the power signal, such as, for example, an AND gate at the output of the oscillator, or a PWM signal applied directly to a 555 timer to enable and disable the output, or a stealer transistor applied anywhere desired in the power source, or a transistor placed in series with the primary or secondary winding of the transformer under the control of a PWM control signal, etc. A PWM control circuit 524 may be applied in any embodiment of the power source as desired, such as in the embodiments illustrated in FIGS. 11 through 16.

Figure 4A:
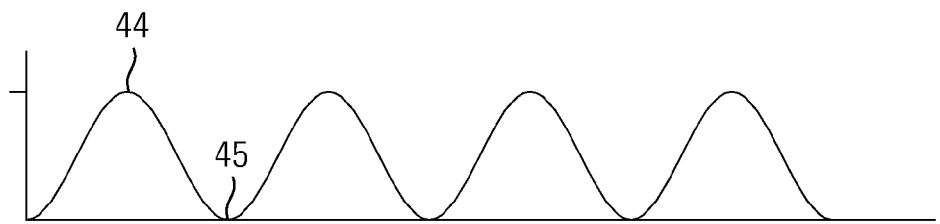
FIGS. 4A-4D are exemplary envelope waveforms that may be generated by high voltage AC power sources for exemplary drivers.
Figure 4B:
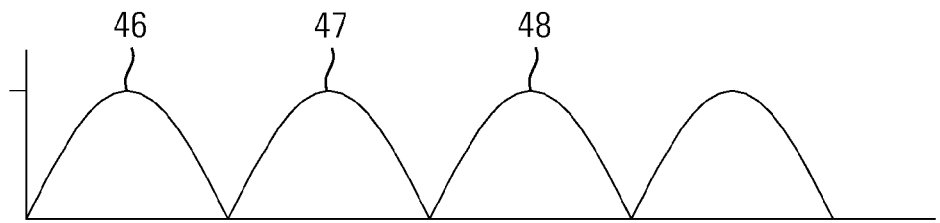
Figure 4C:
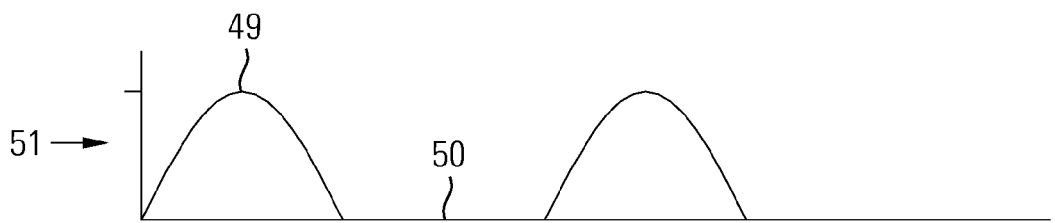
Figure 4C:
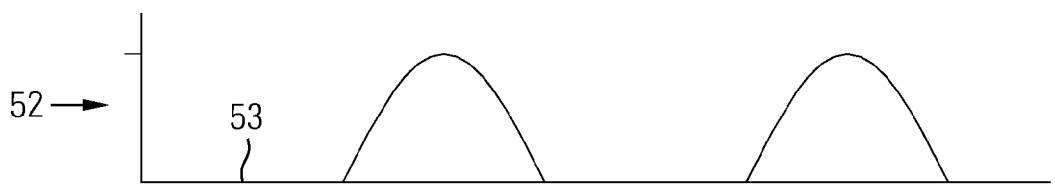
Figure 4D:
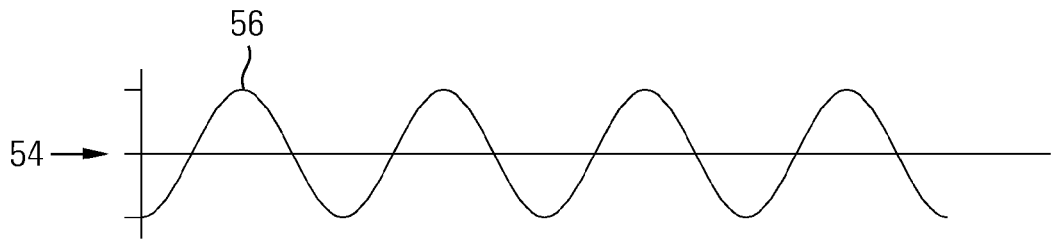
Figure 4D:
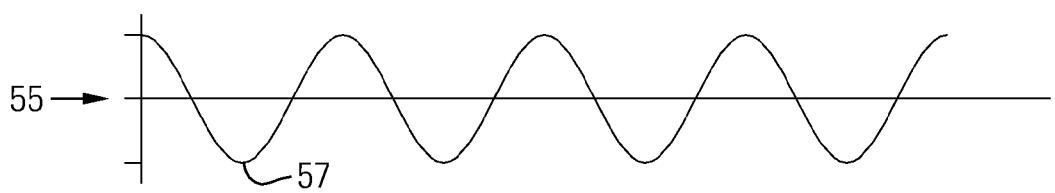
Figure 13:
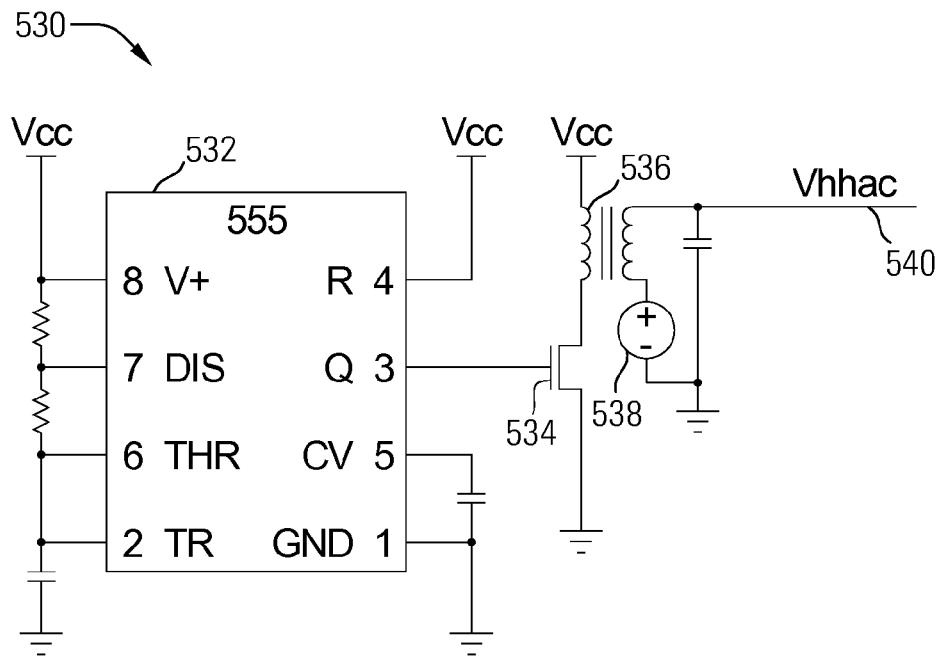
FIG. 13 is an exemplary circuit for a DC-biased sine wave power source.
Figure 14:
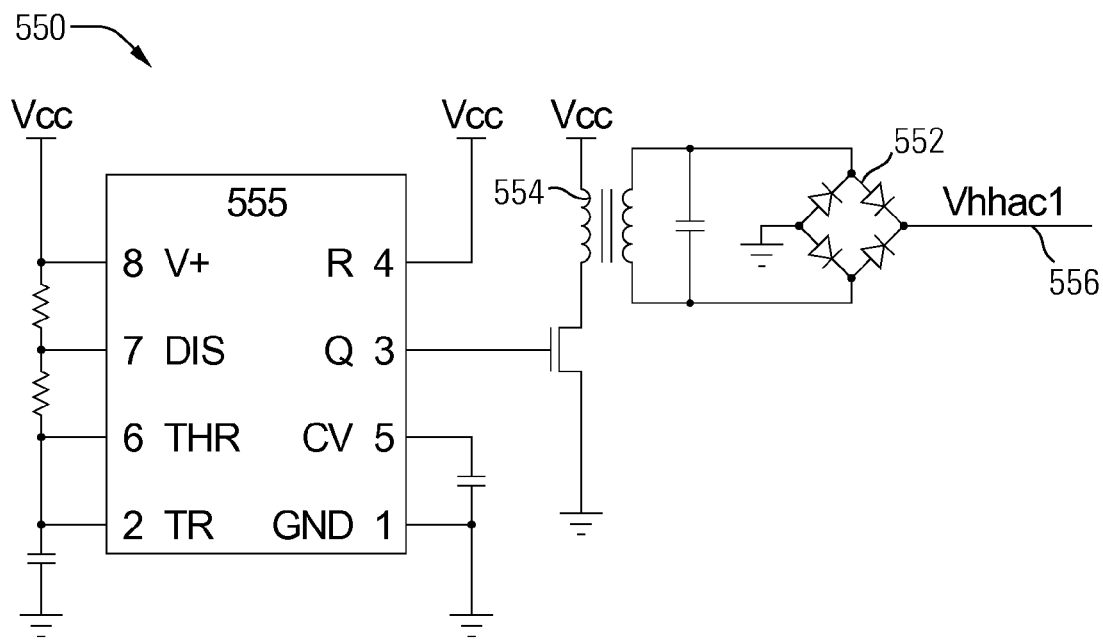
FIG. 14 is an exemplary circuit with a full-bridge rectifier for a full-wave rectified power source.

Referring now to FIG. 13, an exemplary power source 530 is illustrated for generating a DC-biased non-rectified full sine wave as shown in FIG. 4A. As an example a 555 timer 532 generates a square wave which controls an NMOS transistor 534 (or transistors for example configured in a push pull configuration) to pull the primary winding of a transistor 536 alternately between power and ground. A DC power supply 538 is placed below the low side of the secondary winding of the transistor 536 to bias the resulting sine wave at the output 540 up to or above ground. Referring now to FIG. 14, an exemplary power source 550 is illustrated for generating a full-wave rectified sine as shown in FIG. 4B. In this embodiment, a bridge rectifier 552 made up of four diodes is placed across the secondary winding of the transformer 554 to generate the full-wave rectified sine output 556.

Figure 15:
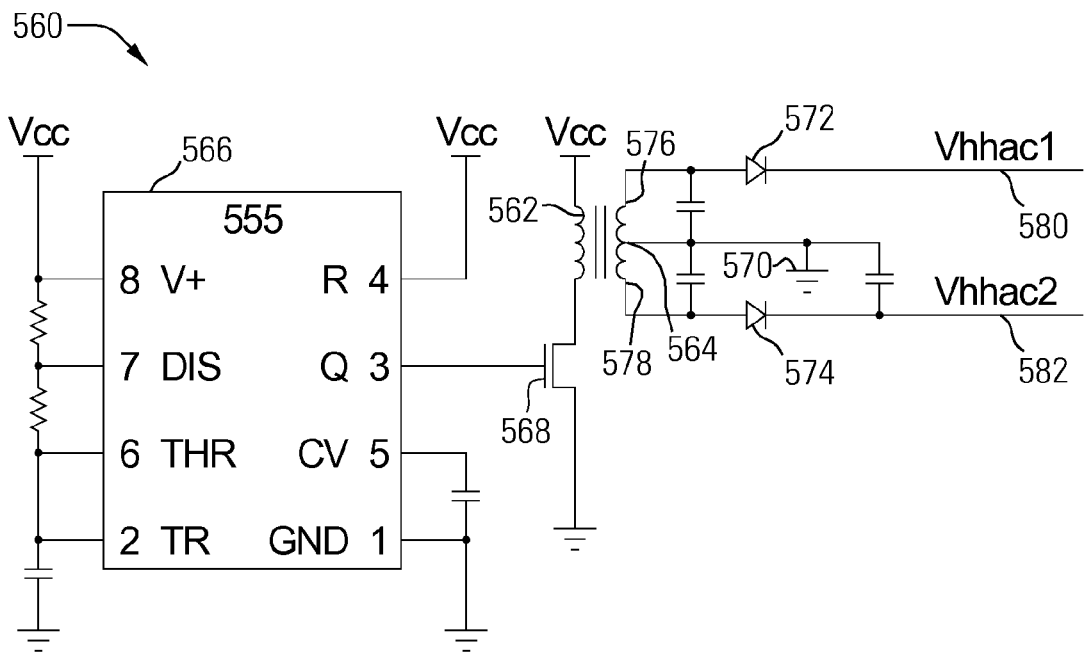
FIG. 15 is an exemplary circuit for a half-wave rectified power source having two outputs 180 degrees out of phase.

Referring now to FIG. 15, an exemplary two-phase power source 560 is illustrated for generating two half-wave rectified sine waves as shown in FIG. 4C, each 180 degrees out of phase. A transformer 562 having a center-tapped secondary winding 564 is driven by, for example, a 555 timer 566 and NMOS transistor 568. The center tap 564 is connected to ground 570, and diodes 572 and 574 are connected at the outer taps 576 and 578, respectively, to generate the two opposite-phase half-wave rectified sine outputs 580 and 582.

Figure 16:
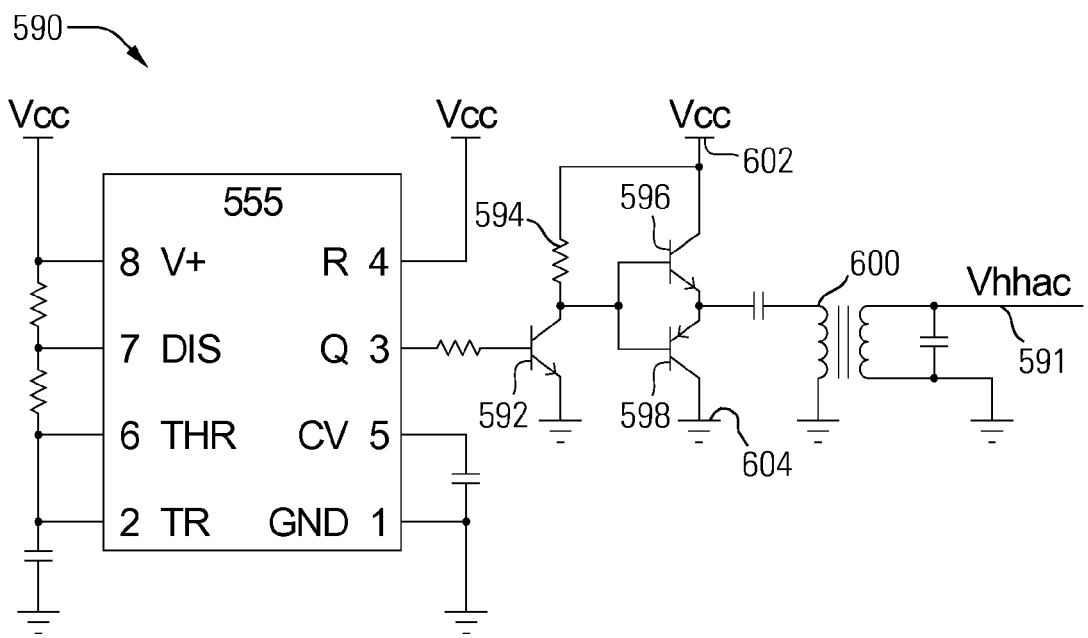
FIG. 16 is an exemplary circuit for an inverter-driven sine wave power source.

Referring now to FIG. 16, an exemplary inverter-driven power source 590 is illustrated for generating a non-rectified full sine wave at the output 591 as in FIG. 4D. An inverter is formed of a BJT transistor 592 and a pullup resistor 594, controlling a pair of BJT transistors 596 and 598 that alternately pull the primary winding of a transformer 600 between power 602 and ground 604. Note again that the method and apparatus for supplying power is not limited to any particular circuit for generating the desired high voltage envelope that is supplied to each driver. The square wave from the oscillator may be transformed into a sine wave by selecting the desired frequency response of the transformer, or by any other suitable method. For example, resonant circuits, or low pass or band pass circuits may be used to limit the square wave to only the first (fundamental) harmonic.

Note that the exemplary embodiments in FIGS. 11 through 16 are not limited to use with any particular type of switch or transistor. For example, alternative embodiments may employ other types of transistors such as BJT's, MOSFETS, Darlington transistors, push-pull configurations, etc.

Figure 18:
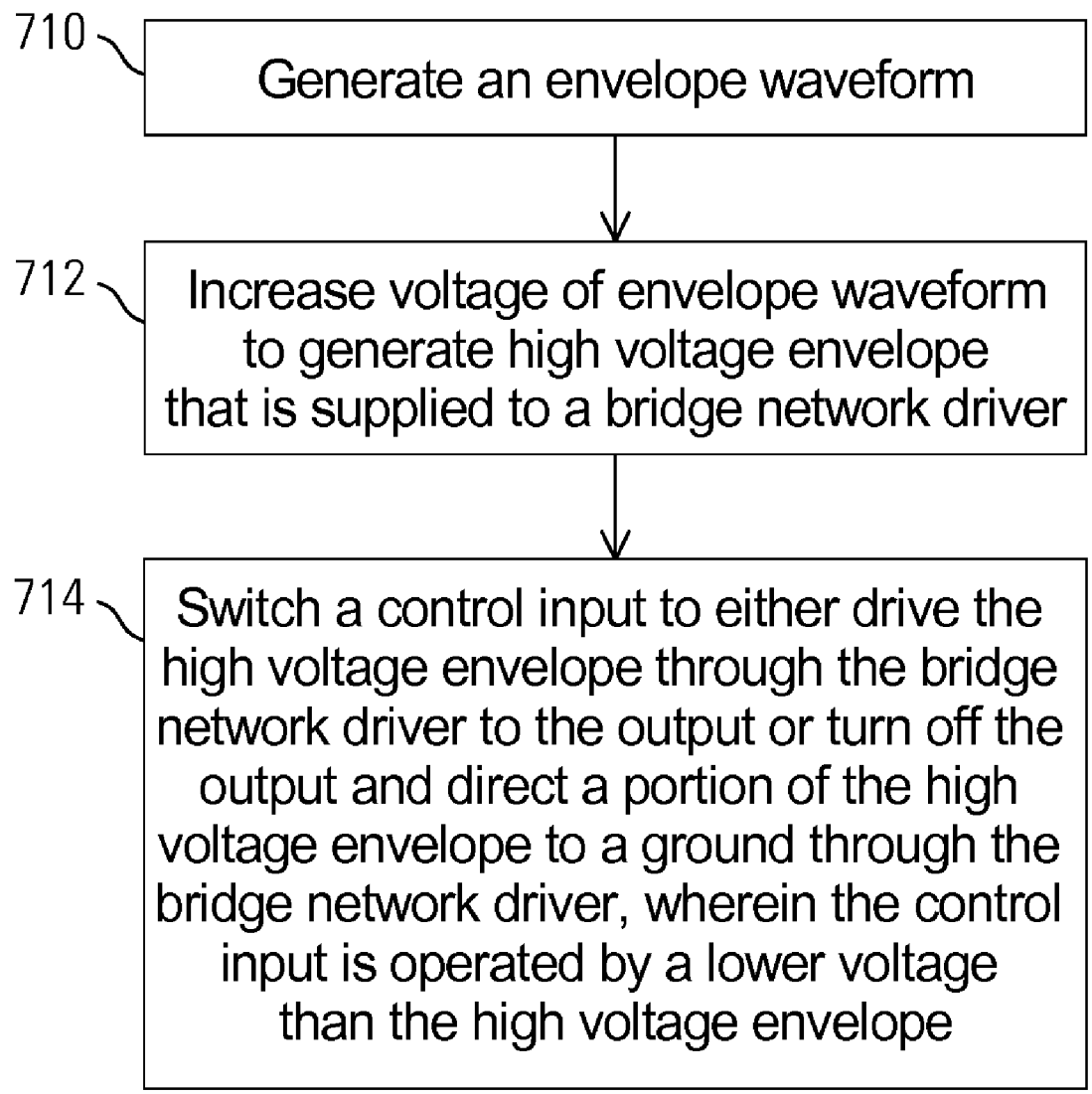
FIG. 18 is a flow chart of an exemplary operation for driving current to an output.

Referring now to FIG. 18, an exemplary operation for supplying an individually controllable current to multiple loads will be described. An envelope waveform is generated 710, for example, using a 555 timer. The voltage of the envelope waveform is amplified 712, for example, using one or more transistors controlled by the output of the 555 timer to control a transformer to step up the voltage that is supplied to one or more bridge network drivers. A control input on each bridge network driver is switched 714 to either drive the high voltage envelope through the bridge network driver to the output or to turn off the output and direct a portion of the high voltage envelope to a ground through the bridge network driver. The control input may be operated by a lower voltage than the high voltage envelope.

The power supply multiple drivers disclosed herein provides substantial benefits over conventional power supplies. Multiple loads may be driven by the current from a single high voltage power source, and the current may be controlled individually using low voltage analog and/or digital control inputs including being PWM controlled. The drivers are envelope-driven, enabling various envelopes or waveforms to be supplied to a load. A low cost, compact power supply may thus be used to provide multiple easily controlled outputs.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A power supply, comprising:
    a power source having a first power source output and a second power source output, each 180 degrees out of phase from the other; and
    a plurality of drivers connected to said first and second power source outputs, at least one of said plurality of drivers comprising:
    a full bridge network comprising a first switch, a second switch, a third switch, a fourth switch, a bridge network output and a second bridge network output, said first switch connected between said first power source output and said bridge network output, said second switch connected between said bridge network output and a voltage reference node, said bridge network further comprising at least one control input connected to said second switch, said third switch connected between said second power source output and said second bridge network output, said fourth switch connected between said second bridge network output and said voltage reference node, said bridge network further comprising at least one second control input connected to said fourth switch, said power source comprising an alternating current source, said at least one of said plurality of drivers being an envelope-driven driver wherein a waveform at said bridge network output tracks a waveform of said alternating current source.

2. A power supply comprising a power source and at least one bridge network driver, said at least one bridge network driver comprising:
    a first transistor having an input connected to an output of said power source, an output connected to a driver output, and a control input connected to said power source output through a first resistor;
    a diode connected at an anode to said first transistor output and at a cathode to said first transistor control input;
    a second transistor connected at an input to said diode cathode, at an output to a voltage reference node, and to a control signal at a control input;
    at least one stacked transistor connected between said first transistor and said power source output;
    at least one second stacked transistor connected between said second transistor and said diode cathode; and
    a gate resistor network connected in series between said power source output and said voltage reference node, said at least one stacked transistor and said at least one second stacked transistor having control inputs connected to nodes between resistors in said gate resistor network.

3. The power supply of claim 2, further comprising a negative voltage protection diode connected between each of said at least one second stacked transistor.

4. The power supply of claim 3, further comprising a voltage divider network connected to nodes adjacent said at least one negative voltage protection diodes.

5. A power supply comprising a power source and at least one bridge network driver, said at least one bridge network driver comprising:
    a first transistor having an input connected to an output of said power source, an output connected to a driver output, and a control input connected to said power source output through a first resistor;
    a diode connected at an anode to said first transistor output and at a cathode to said first transistor control input;
    a second transistor connected at an input to said diode cathode, at an output to a voltage reference node, and to a control signal at a control input;
    a current mirror transistor having an input connected to a reference current source, an output connected to said voltage reference node through a third resistor, and a control input connected to said second transistor control input and to said current mirror transistor input; and
    a stealer transistor having an input connected to said second transistor control input, an output connected to said voltage reference node and a control input connected to a digital control signal.

* * * * *